(12) United States Patent
Kawaji et al.

(10) Patent No.: US 12,248,063 B2
(45) Date of Patent: Mar. 11, 2025

(54) ELECTRONIC DEVICE, METHOD FOR CONTROLLING ELECTRONIC DEVICE, AND PROGRAM FOR CONTROLLING ELECTRONIC DEVICE

(71) Applicant: KYOCERA Corporation, Kyoto (JP)

(72) Inventors: Satoshi Kawaji, Yokohama (JP); Tooru Sahara, Yokohama (JP); Takuya Homma, Yokohama (JP); Masamitsu Nishikido, Yokohama (JP); Youhei Murakami, Yokohama (JP); Masayuki Sato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 347 days.

(21) Appl. No.: 17/754,451

(22) PCT Filed: Oct. 2, 2020

(86) PCT No.: PCT/JP2020/037649
§ 371 (c)(1),
(2) Date: Apr. 1, 2022

(87) PCT Pub. No.: WO2021/070762
PCT Pub. Date: Apr. 15, 2021

(65) Prior Publication Data
US 2022/0342068 A1  Oct. 27, 2022

(30) Foreign Application Priority Data

Oct. 10, 2019 (JP) .................................. 2019-187031

(51) Int. Cl.
*G01S 13/931* (2020.01)
*G01S 7/40* (2006.01)
*G01S 13/32* (2006.01)

(52) U.S. Cl.
CPC .............. *G01S 13/931* (2013.01); *G01S 7/40* (2013.01); *G01S 13/32* (2013.01); *G01S 2013/9327* (2020.01)

(58) Field of Classification Search
CPC .......... G01S 13/931; G01S 7/40; G01S 13/32; G01S 2013/9327; G01S 13/343;
(Continued)

(56) References Cited

U.S. PATENT DOCUMENTS

2005/0062615 A1  3/2005  Braeuchle et al.
2010/0076709 A1  3/2010  Hukkeri et al.
(Continued)

FOREIGN PATENT DOCUMENTS

JP  2001-349937 A  12/2001
JP  2006-240453 A   9/2006
(Continued)

OTHER PUBLICATIONS

WO2019003631A1_Description_20240430_1652.pdf—translation of WO2019003631A1 (Year: 2019).*
(Continued)

*Primary Examiner* — Olumide Ajibade Akonai
*Assistant Examiner* — Yonghong Li
(74) *Attorney, Agent, or Firm* — Studebaker & Brackett PC

(57) ABSTRACT

An electronic device includes a plurality of sensors installed in predetermined orientations at different positions. Each of the plurality of sensors includes a transmission antenna that transmits a transmission wave, a reception antenna that receives a reflected wave that is the transmission wave having been reflected, and a control unit that detects an object that reflects the transmission wave, based on a transmission signal transmitted as the transmission wave and a reception signal received as the reflected wave. The elec- (Continued)

tronic device further includes a determination unit that determines a shift in orientation of at least any of the plurality of sensors, based on detection results of an object obtained by the plurality of sensors.

9 Claims, 17 Drawing Sheets

(58) Field of Classification Search
CPC .... G01S 13/4454; G01S 13/584; G01S 13/87; G01S 7/356; G01S 7/403; G01S 7/4034; G01S 2013/0254; G01S 2013/932; G01S 2013/93271; G01S 2013/93272; G01S 2013/93274
See application file for complete search history.

(56) References Cited

U.S. PATENT DOCUMENTS

| | | | |
|---|---|---|---|
| 2012/0290169 A1* | 11/2012 | Zeng | G01S 7/4972 701/30.2 |
| 2017/0261600 A1* | 9/2017 | Maennicke | G01S 7/4026 |
| 2017/0276788 A1* | 9/2017 | Wodrich | G01S 13/931 |
| 2019/0187250 A1 | 6/2019 | Ru et al. | |
| 2019/0391250 A1* | 12/2019 | Cohen | G01S 13/87 |
| 2021/0141054 A1 | 5/2021 | Tsushima et al. | |

FOREIGN PATENT DOCUMENTS

| | | | | |
|---|---|---|---|---|
| JP | 2011-117800 A | | 6/2011 | |
| JP | 2011-226810 A | | 11/2011 | |
| JP | 2014153211 A | * | 8/2014 | |
| JP | 2018-162977 A | | 10/2018 | |
| WO | 2018/163277 A1 | | 9/2018 | |
| WO | WO-2019003631 A1 | * | 1/2019 | G01S 13/87 |

OTHER PUBLICATIONS

JP2014153211A_Description_20240501_1336.pdf—translation of JP2014153211A (Year: 2014).*
WO2019003631_Fig2_translation.pdf (Year: 2019).*
WO2019003631_Fig7_translation (Year: 2019).*
WO2019003631_Fig8_translation (Year: 2019).*

* cited by examiner

FIG. 15
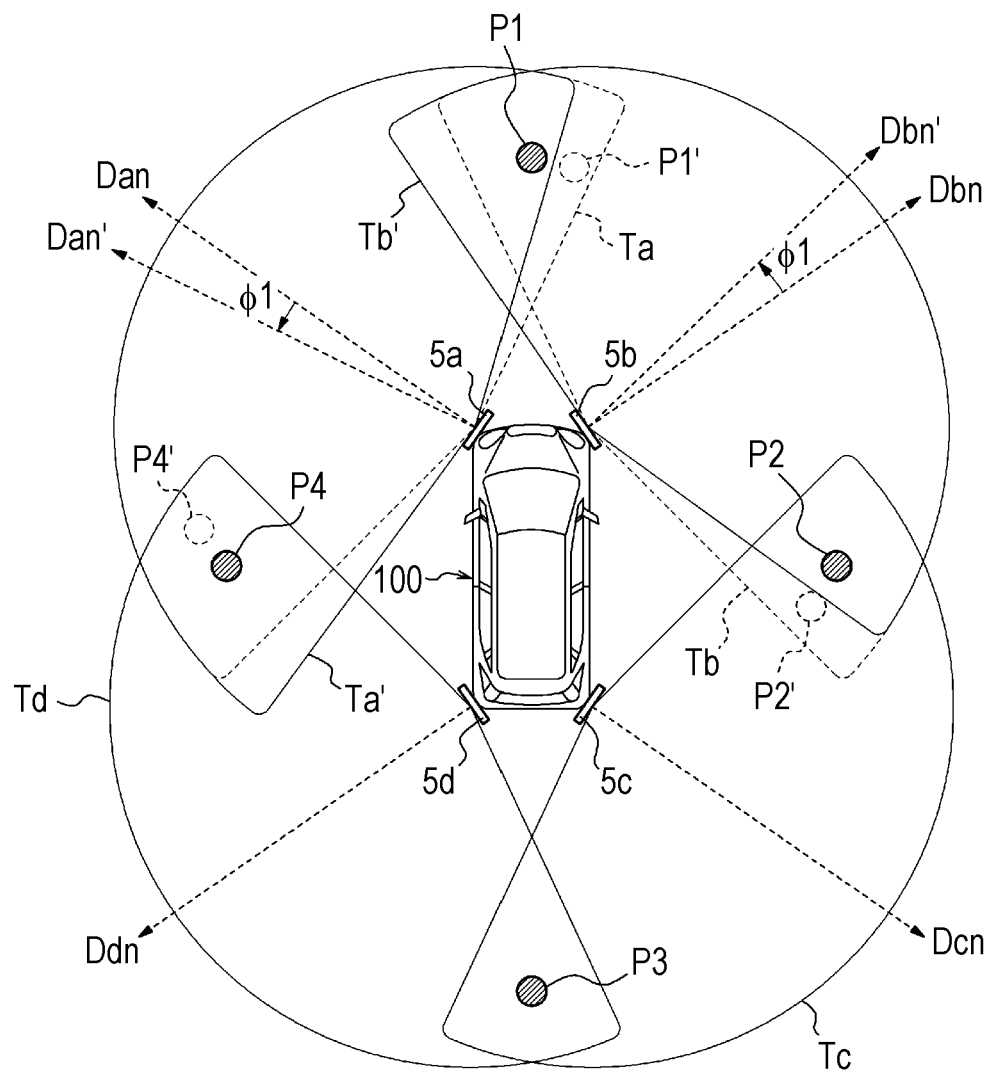
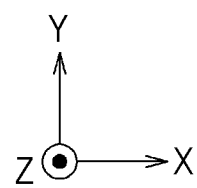

ELECTRONIC DEVICE, METHOD FOR CONTROLLING ELECTRONIC DEVICE, AND PROGRAM FOR CONTROLLING ELECTRONIC DEVICE

CROSS-REFERENCE TO RELATED APPLICATIONS

This application claims priority from Japanese Patent Application No. 2019-187031 filed in Japan on Oct. 10, 2019, the entire disclosure of which is incorporated herein by reference.

TECHNICAL FIELD

The present disclosure relates to an electronic device, a method for controlling an electronic device, and a program for controlling an electronic device.

BACKGROUND ART

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and by receiving reflected wave reflected off the object. Such a technology for measuring a distance or the like expectedly becomes more important in the future with progresses of a technology for assisting drivers in driving and an automated-driving-related technology for partially or entirely automating driving.

There have been proposed some techniques for detecting that a sensor that receives a reflected wave which is a transmitted radio wave reflected off a predetermined object is shifted from an installed orientation because of some reasons. For example, PTL 1 discloses a technique for inspecting an on-vehicle radar by using a reflector after a vehicle is mounted on a rotating table. In addition, for example, PTL 2 and PTL 3 disclose techniques for adjusting an installation angle of an on-vehicle radar device by using a laser device separately from the radar device. In addition, PTL 4 discloses a technique for detecting an abnormality of a radar by using an acceleration sensor that detects an impact. Further, PTL 5 discloses a description for determining a failure in a sensor such as a millimeter-wave radar in accordance with whether or not there is data indicating a characteristic seen when the sensor is normal. In PTL 5, the data indicating the characteristic seen when the sensor is normal is generated based on map data, GPS-based position measurement data, data detected by a camera.

CITATION LIST

Patent Literature

PTL 1: Japanese Unexamined Patent Application Publication No. 2011-117800
PTL 2: Japanese Unexamined Patent Application Publication No. 2011-226810
PTL 3: Japanese Unexamined Patent Application Publication No. 2001-349937
PTL 4: Japanese Unexamined Patent Application Publication No. 2006-240453
PTL 5: International Publication No. 2018/163277

SUMMARY OF INVENTION

An electronic device according to one embodiment is
an electronic device including a plurality of sensors installed in predetermined orientations at different positions,
each of the plurality of sensors including
a transmission antenna that transmits a transmission wave,
a reception antenna that receives a reflected wave that is the transmission wave having been reflected, and
a control unit that detects an object that reflects the transmission wave, based on a transmission signal transmitted as the transmission wave and a reception signal received as the reflected wave,
the electronic device further including a determination unit that determines a shift in orientation of at least any of the plurality of sensors, based on detection results of an object obtained by the plurality of sensors.

A method for controlling an electronic device according to one embodiment is
a method for controlling an electronic device including a plurality of sensors installed in predetermined orientations at different positions,
each of the plurality of sensors including
a transmission antenna that transmits a transmission wave,
a reception antenna that receives a reflected wave that is the transmission wave having been reflected, and
a control unit that detects an object that reflects the transmission wave, based on a transmission signal transmitted as the transmission wave and a reception signal received as the reflected wave,
the method including a step of determining a shift in orientation of at least any of the plurality of sensors, based on detection results of an object obtained by the plurality of sensors.

A program for controlling an electronic device according to one embodiment is
a program for controlling an electronic device including a plurality of sensors installed in predetermined orientations at different positions,
each of the plurality of sensors including
a transmission an that transmits a transmission wave,
a reception antenna that receives a reflected wave that is the transmission wave having been reflected, and
a control unit that detects an object that reflects the transmission wave, based on a transmission signal transmitted as the transmission wave and a reception signal received as the reflected wave,
the program causing the electronic device to perform a step of determining a shift in orientation of at least any of the plurality of sensors, based on detection results of an object obtained by the plurality of sensors.

BRIEF DESCRIPTION OF DRAWINGS

FIG. 15 is a diagram for describing an operation of the electronic device according to the one embodiment.

DESCRIPTION OF EMBODIMENTS

Figure 1:
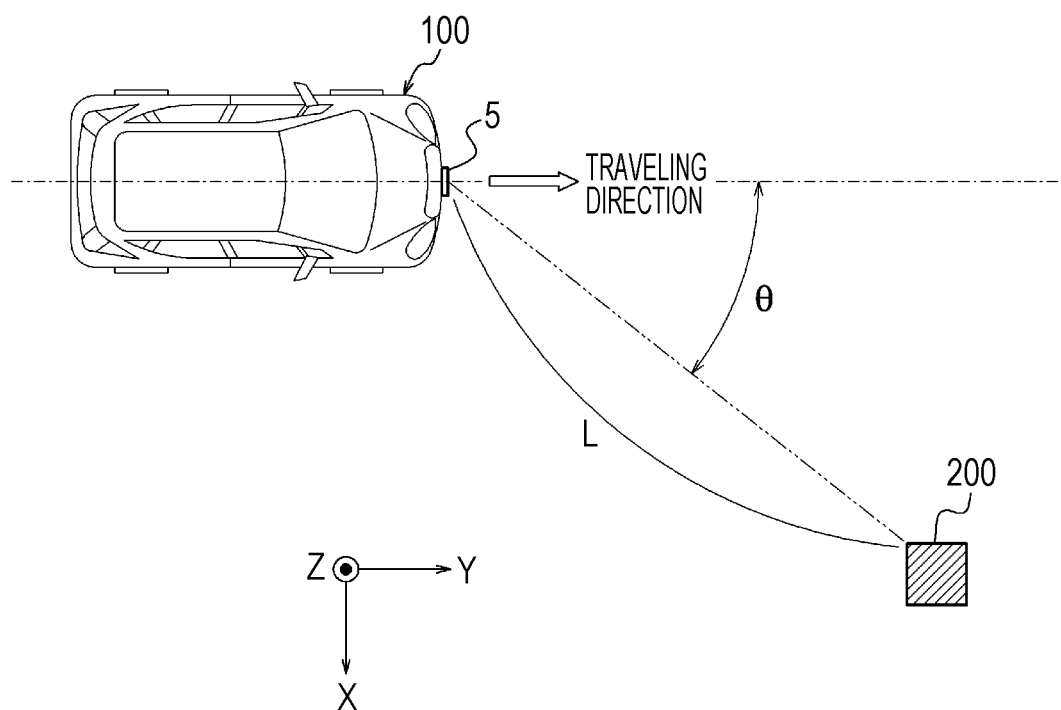
FIG. 1 is a diagram for describing how an electronic device according to one embodiment is used.

The convenience can be improved if whether installed states of a plurality of sensors are appropriate can be determined in an electronic device including the sensors that receive a reflected wave that is a transmission wave transmitted and reflected off a predetermined object. An object of the present disclosure is to provide an electronic device capable of determining whether installed states of a plurality of sensors are appropriate in the electronic device that performs detection of an object by using the sensors, a method for controlling the electronic device, and a program for controlling the electronic device. According to one embodiment, an electronic device capable of determining whether installed states of a plurality of sensors are appropriate in the electronic device that performs detection of an object by using the sensors, a method for controlling the electronic device, and a program for controlling the electronic device can be provided. One embodiment is described in detail below with reference to the drawings.

An electronic device according to one embodiment is mounted in a vehicle (mobility device) such as an automobile, for example, and thus is capable of detecting a predetermined object located around the mobility device. To this end, the electronic device according to the one embodiment is capable of transmitting a transmission wave to an area around the mobility device from a transmission antenna installed on the mobility device. The electronic device according to the one embodiment is also capable of receiving a reflected wave that is the reflected transmission wave, from a reception antenna installed on the mobility device. At least one of the transmission antenna and the reception antenna may be included in a radar sensor or the like installed on the mobility device, for example.

A configuration in which the electronic device according to the one embodiment is mounted in an automobile such as a passenger car is described below as a typical example. However, the mobility device in which the electronic device according to the one embodiment is mounted is not limited to an automobile. The electronic device according to the one embodiment may be mounted in various mobility devices such as a bus, a truck, a taxi, a motorcycle, a bicycle, a ship, an aircraft, an ambulance, a fire engine, a helicopter, and a drone. The mobility device in which the electronic device according to the one embodiment is mounted is not necessarily limited to a mobility device that moves by its own motive power. For example, the mobility device in which the electronic device according to the one embodiment is mounted may be a trailer towed by a tractor. The electronic device according to the one embodiment is capable of measuring a distance or the like between the sensor and a predetermined object when at least one of the sensor and the object is movable. The electronic device according to the one embodiment is also capable of measuring e distance or the like between the sensor and the object even when both the sensor and the object are stationary. In addition, the automobile encompassed by the present disclosure is not limited by the overall length, the overall width, the overall height, the displacement, the seating capacity, the load, or the like. For example, the automobiles of the present disclosure include an automobile having a displacement greater than 660 cc and an automobile having a displacement less than or equal to 660 cc that is a so-called light automobile. The automobiles encompassed by the present disclosure also include an automobile that partially or entirely uses electricity as energy and uses a motor.

An example of how the electronic device according to the one embodiment detects an object is described first.

FIG. 1 is a diagram for describing how the electronic device according to the one embodiment is used. FIG. 1 illustrates an example in which a sensor including a transmission antenna and a reception antenna according to the one embodiment is installed on a mobility device.

A sensor 5 including a transmission antenna and a reception antenna according to the one embodiment is installed on a mobility device 100 illustrated in FIG. 1. It is assumed that an electronic device 1 according to the one embodiment is also mounted (for example, built) in the mobility device 100 illustrated in FIG. 1. A specific configuration of the electronic device 1 is described later. The sensor 5 may include at least one of the transmission antenna and the reception antenna, for example. The sensor 5 may also appropriately include at least any of other functional units, such as at least part of a control unit 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor in this manner, the electronic device 1 can detect the predetermined object 200 located within a predetermined distance from the mobility device 100. For example, as illustrated in FIG. 1, the electronic device 1 can measure a distance L between the mobility device 100, which is vehicle of interest, and the predetermined object 200. The electronic device 1 can also measure a relative velocity between the mobility device 100, which is the vehicle of interest, and the predetermined object 200. The electronic device 1 can further measure a direction (an angle of arrival 9) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a pedestrian, a guardrail, a median strip, a road sign, a step on a sidewalk, a wall, a manhole, or an obstacle. The object 200 may be in motion or stationary. For example, the object 200 may be an automobile or the like that is parked or stationary around the mobility device 100. In addition the object 200 may be located not only on a road but also at an appropriate place such as on a sidewalk, in a farm, on a farmland, in a parking lot, in a vacant lot, a space on a road, in a store, at a crossing, on the water, in the air, in a gutter, in a river, in another mobility device, in a building, inside or outside of other structures. In the present disclosure, the object 200 detected by the sensor includes living things such as a person, a dog, a cat, a horse, and other animals in addition to non-living things. The object 200 detected by the sensor 5 in the present disclosure includes a target, which includes a person, an object, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed on an outer portion of the mobility device 100. However, in one embodiment, the sensor 5 may be installed at various positions of the mobility device 100. For example, in one embodiment, the sensor 5 may be installed inside a bumper of the mobility device 100 so as not to be seen in the appearance of the mobility device 100. In addition, the position where the sensor 5 is installed in the mobility device 100 may be either outside or inside of the mobility device 100. The inside of the mobility device 100 may refer to, for example, inside of the body of the mobility device 100, inside of the bumper, inside of a headlight, a space in the mobility device 100, or any combination of these.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
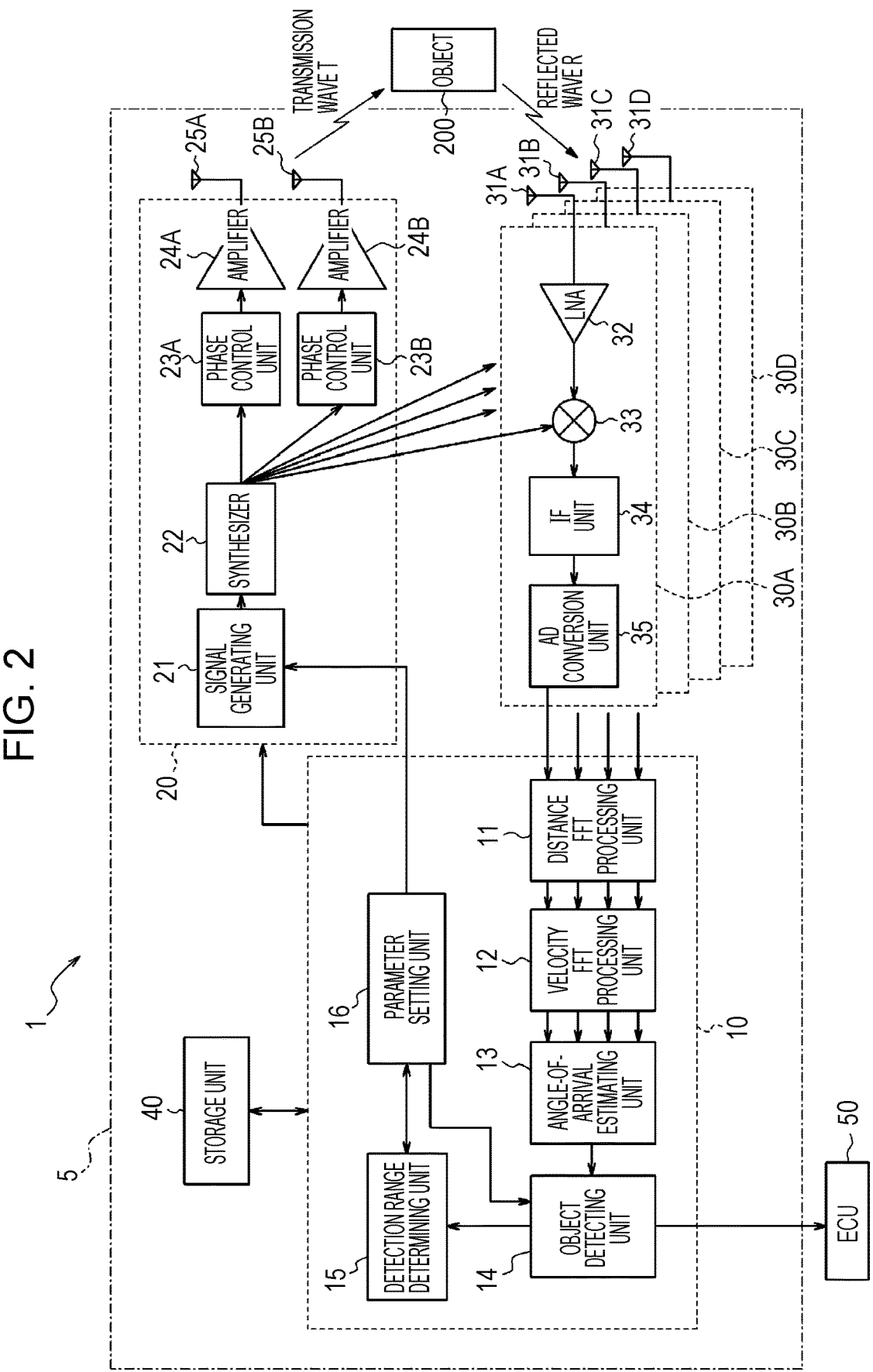
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency bandwidth of 79 GHz has a characteristic that the usable frequency bandwidth is wider than another millimeter-wave and/or quasi-millimeter-wave radar of a frequency band of 24 GHz, 60 GHz, or 76 GHz, for example. Such an embodiment is described below. The FMCW radar scheme used in the present disclosure may include an FCM scheme (Fast-Chirp Modulation) for transmitting chirp signals at a shorter period than usual. A signal generated by a signal generating unit 21 is not limited to a signal of the FM-CW scheme. The signal generated by the signal generating unit 21 may be a signal of various schemes other than the FM-CW scheme. A transmission signal sequence stored in a storage unit 40 may change in accordance with these various schemes. For example, in the case of a radar signal of the FM-CW scheme described above, a signal whose frequency increases for each time sample and a signal whose frequency decreases for each time sample may be used. More detailed description of the various schemes described above is omitted because known techniques can be appropriately employed.

As illustrated in FIG. 2, the electronic device 1 according to the one embodiment includes the sensor 5 and an ECU (Electronic Control Unit) 50. The ECU 50 controls various operations of the mobility device 100. The ECU 50 may be constituted by at least one or more ECUs. The electronic device 1 according to the one embodiment includes the control unit 10. The electronic device 1 according to the one embodiment may also appropriately include another functional unit such as at least any of a transmission unit 20, reception units 30A to 30D, and the storage unit 40. As illustrated in FIG. 2, the electronic device 1 may include a plurality of reception units such as the reception units 30A to 30D. When the reception units 30A, 30B, 30C, and 30D are not distinguished from one another, the reception units 30A, 30B, 30C, and 30D are simply referred to as "reception units 30" below.

The control unit 10 may include a distance FFT processing unit 11, a velocity FF1 processing unit 12, an angle-of-arrival estimating unit 13, an object detecting unit 14, a detection range determining unit 15, and a parameter setting unit 16. These functional units included in the control unit 10 are further described later.

As illustrated in FIG. 2, the transmission unit 20 may include the signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the plurality of reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the control unit 10.

The control unit 10 included in the electronic device 1 according to the one embodiment is capable of controlling the individual functional units of the electronic device 1 and also controlling operations of the entire electronic device 1. To provide control and processing capabilities for executing various functions, the control unit 10 may include at least one processor, for example, a CPU (Central Processing Unit). The control unit 10 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the control unit 10 may be configured as, for example, a CPU and a program executed by the CPU. The control unit 10 may appropriately include a memory required for operations of the control unit 10.

The storage unit 40 may store a program executed by the control unit 10, results of processing performed by the control unit 10, etc. The storage unit 40 may function as a work memory of the control unit 10. The storage unit 40 may be constituted by, for example, a semiconductor memory or a magnetic disk. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the control unit 10 as described above.

In the one embodiment, the storage unit 40 may store various parameters for setting a range in which an object is detected on the basis of a transmission wave T transmitted from each transmission antenna 25 and a reflected wave R received from each reception antenna 31. Such parameters are further described later.

In the electronic device 1 according to the one embodiment, the control unit 10 is capable of controlling at least one of the transmission unit 20 and the reception units 30. In tris case, the control unit 10 may control at least one of the transmission unit 20 and the reception units 30 on the basis of various kinds of information stored in the storage unit 40. In the electronic device 1 according to the one embodiment, the control unit 10 may instruct the signal generating unit 21 to generate a signal or may control the signal generating unit 21 to generate a signal.

In accordance with control performed by the control unit 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the control unit 10, for example. Specifically, the signal generating unit 21 may allocate a frequency of the transmission signal in accordance with a parameter set by the parameter setting unit 16. For example, the signal generating unit 21 receives frequency information from the control unit 10 (the parameter setting unit 16) and generates a signal having a predetermined frequency in a frequency band such as from 77 GHz to 81 GHz, for example. The signal generating unit 21 may include a functional unit serving as a voltage control oscillator (VCO), for example.

The signal generating unit 21 may be configured as hardware having the function, as for example a microcomputer, or as for example a processor such as a CPU and a program or the like executed by the processor. Each functional unit described below may also be configured as hardware having the function, as for example a microcomputer if possible, or as for example a processor such as a CPU and a program or the like executed by the processor.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. The signal generated by the signal generating unit 21 may be set in advance by the control unit 10, for example. The signal generated by the signal generating unit 21 may be stored in advance in the storage unit 40 or the like, for example. Since chirp signals used in a technical field such as the radar are known, more detailed description is appropriately simplified or omitted. The signal generated by the signal generating unit 21 is supplied to the synthesizer 22.

Figure 3:
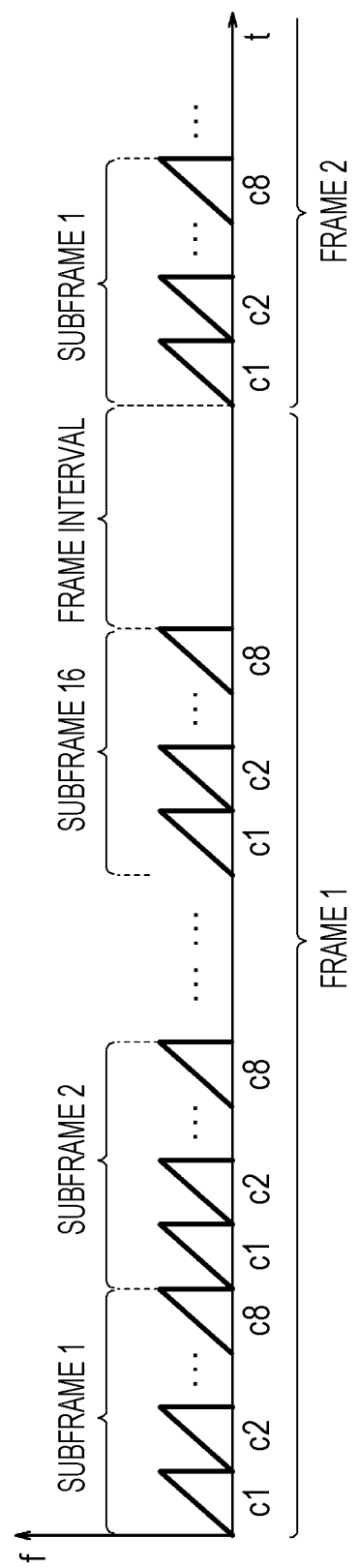
FIG. 3 is a diagram for describing a configuration of a transmission signal according to the one embodiment.

FIG. 3 is a diagram for describing an example of chirp signals generated by the signal generating unit 21.

In FIG. 3, the horizontal axis represents elapsed time, and the vertical axis represents a frequency. In the example illustrated in FIG. 3, the signal generating unit 21 generates linear chirp signals whose frequency changes linearly and periodically. In FIG. 3, the individual chirp signals are denoted by $c_1, c_2, \ldots, c_8$. As illustrated in FIG. 3, the frequency of each chirp signal linearly Increases as time elapses.

In the example illustrated in FIG. 3, eight chirp signals $c_1, c_2, \ldots, c_8$ constitute one subframe. That is, each of subframes such as a subframe 1 and a subframe 2 illustrated in FIG. 3 includes eight chirp signals $c_1, c_2, \ldots, c_8$. In the example illustrated in FIG. 3, 16 subframes such as the subframes 1 to 16 constitute one frame. That is, each of frames such as a frame 1 and a frame 2 illustrated in FIG. 3 includes 16 subframes. As illustrated in FIG. 3, a frame interval of a predetermined length may be included between frames.

In FIG. 3, the frame 2 and subsequent frames may have the same and/or similar configuration. In FIG. 3, the frame 3 and subsequent frames may have the same and/or similar configuration. In the electronic device 1 according to the one embodiment, the signal generating unit 21 may generate a transmission signal as any number of frames. In FIG. 3, an illustration of some chirp signals is omitted. As described above, a relationship between time and a frequency of the transmission signal generated by the signal generating unit 21 may be stored in the storage unit 40 or the like, for example.

As described above, the electronic device according to the one embodiment may transmit a transmission signal constituted by subframes each including a plurality of chirp signals. The electronic device 1 according to the one embodiment may transmit a transmission signal constituted by frames each including a predetermined number of subframes.

Description is given below on the assumption that the electronic device 1 transmits a transmission signal having a frame structure illustrated in FIG. 3. However, the frame structure illustrated in FIG. 3 is an example. For example, the number of chirp signals included in one subframe is not limited to eight. In the one embodiment, the signal generating unit 21 may generate a subframe including any number (for example, a plurality) of chirp signals. A subframe structure illustrated in FIG. 3 is also an example. For example, the number of subframes included in one frame is not limited to 16. In the one embodiment, the signal generating unit 21 may generate a frame including any number (for example, a plurality) of subframes.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. The frequency selected as the frequency of the transmission wave T to be transmitted from each of the transmission antennas 25 may be set by the control unit 10, for example. For example, the frequency selected as the frequency of the transmission wave T to be transmitted from each of the transmission antennas 25 may be a frequency selected by the parameter setting unit 16. The frequency selected as the frequency of the transmission wave T to be transmitted from each of the transmission antennas 25 may be stored in the storage unit 40, for example. The signal whose frequency has been increased by the synthesizer 22 is supplied to a phase control unit 23 and the mixer 33. When the plurality of phase control units 23 are present, the signal whose frequency has been increased by the synthesizer 22 may be supplied to each of the plurality of phase control units 23. When the plurality of reception units 30 are present, the signal whose frequency has been increased by the synthesizer 22 may be supplied to the mixer 33 of each of the plurality of reception units 30.

Each of the phase control units 23 controls a phase of the transmission signal supplied from the synthesizer 22. Specifically, for example, in accordance with control performed by the control unit 10, each of the phase control units 23 may appropriately advance or delay the phase of the signal supplied from the synthesizer 22 to adjust the phase of the transmission signal. In this case, on the basis of a difference between paths of the transmission waves T to be transmitted from the plurality of transmission antennas 25, the phase control units 23 may adjust the phases of the respective transmission signals. The phase control units 23 appropriately adjust the phases of the respective transmission signals, so that the transmission waves T transmitted from the plurality of transmission antennas 25 enhance with each other in a predetermined direction to form a beam (beamforming). In this case, a correlation between a direction of beamforming and amounts of phase by which the respective transmission signals transmitted by the plurality of transmission antennas 25 are to be controlled may be stored in the storage unit 40, for example. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the control unit 10, for example. When the sensor 5 includes the plurality of transmission antennas 25, each of the plurality of amplifiers 24 may amplify power (electric power) of the transmission signal supplied from a respective one of the plurality of phase control units 23 in accordance with control performed by the control unit 10, for example. Since the technology for amplifying power of a transmission signal is already known, more detailed description is omitted. Each of the amplifiers 24 is connected to a respective one of the transmission antennas 25.

The transmission antenna 25 outputs (transmits), as the transmission wave. The transmission signal amplified by the amplifier 24. When the sensor 5 includes the plurality of transmission antennas 25, each of the plurality of transmission antennas 25 may output (transmit), as the transmission wave T, the transmission signal amplified by a respective one of the plurality of amplifiers 24. Since the transmission antennas 25 can be configured in a manner that is the same as and/or similar to that of transmission antennas for use in the known radar technology, more detailed description is omitted.

The electronic device 1 according to the one embodiment includes the transmission antennas 25 and is capable of transmitting transmission signals (for example, transmission chirp signals) as the transmission waves T from the respective transmission antennas 25 in this manner. At least one of the functional units constituting the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The transmission antennas 25 are covered with a member such as the radar cover, so that a risk of the transmission antennas 25 being damaged or malfunctioning because of a contact with an external object can be reduced. The radar cover and the housing may also be referred to as a radome.

FIG. 2 illustrates an example in which the electronic device 1 includes two transmission antennas 25. However, in the one embodiment, the electronic device 1 may include any number of transmission antennas 25. On the other hand, in the one embodiment, the electronic device 1 may include the plurality of transmission antennas 25 in the case where the transmission waves T transmitted from the respective transmission antennas 25 form a beam in a predetermined direction. In the one embodiment, the electronic device 1 may include a plurality of transmission antennas 25. In this case, the electronic device 1 may include the plurality of phase control units 23 and the plurality of amplifiers 24 to correspond to the plurality of transmission antennas 25. Each of the plurality of phase control units 23 may control the phase of a respective one of the plurality of transmission waves supplied from the synthesizer 22 and to be transmitted from the plurality of transmission antennas 25. Each of the plurality of amplifiers 24 may amplify power of a respective one of the plurality of transmission signals to be transmitted from the plurality of transmission antennas 25. In this case, the sensor 5 may include the plurality of transmission antennas. As described above, when the electronic device 1 illustrated FIG. 2 includes the plurality of transmission antennas 25, the electronic device 1 may include a plurality of functional units necessary for transmitting the transmission waves T from the plurality of transmission antennas 25.

The reception antenna 31 receives the reflected wave R. The reflected wave R may be the transmission wave T reflected off the predetermined object 200. As the reception antenna 31, a plurality of antennas such as the reception antennas 31A to 31D, for example, may be included. Since the reception antennas 31 can be configured in a manner that is the same as and/or similar to that of reception antennas for use in the known radar technology, more detailed description is omitted. The reception antenna 31 is connected to the LNA 32. A reception signal based on the reflected wave R received by the reception antenna 31 is supplied to the LNA The electronic device 1 according to the one embodiment can receive, from each of the plurality of reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The reception antennas 31 are covered with a member such as the radar cover, so that a risk of the reception antennas 31 being damaged or malfunctioning because of a contact with an external object can be reduced. The radar cover and the housing may also be referred to as a radome.

When the reception antennas 31 are installed near the transmission antennas 25, these may be collectively included in one sensor 5. That is, for example, one sensor 5 may Include at least one transmission antenna 25 and at least one reception antenna 31. For example, one sensor 5 may include the plurality of transmission antennas 25 and the plurality of reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be constituted by any analog-to-digital conversion circuit (Analog to Digital Converter (ADC)). The digitized beat signal obtained by the AD conversion unit 35 is supplied to the distance FFT processing unit 11 of the control unit 10. In the case where there are the plurality of reception units 30, the digitized beat signals obtained by the plurality of AD conversion units 35 may be supplied to the distance FFT processing unit 11.

The distance FFT processing unit 11 estimates a distance between the mobility device 100 equipped with the electronic device 1 and the object 200 on the basis of the beat signals supplied from the respective AD conversion units 35. The distance FFT processing unit 11 may include a processing unit that performs fast Fourier transform, for example. In this case, the distance FFT processing unit 11 may be constituted by any circuit, any chip, or the like that performs fast Fourier transform (FFT). The distance FFT processing unit 11 may preform Fourier transform other than fast Fourier transform.

The distance FFT processing unit 11 performs FFT processing (hereinafter, appropriately referred to as "distance FFT processing") on the digitized beat signals obtained by the AD conversion units 35. For example, the distance FFT processing unit 11 may perform the FFT processing on a complex signal supplied from each of the AD conversion units 35. The digitized beat signal obtained by each of the AD conversion units 35 can be represented as a temporal change in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, a method for determining that there is an object (reflecting object) that reflects a transmission wave when a peak value that is equal to or greater than a threshold is detected from the average power or amplitude of a disturbance signal, such as a constant false alarm rate (CFAR) detection process, is known.

As described above, the electronic device 1 according to the one embodiment can detect the object 200 that reflects the transmission wave T on the basis of the transmission signal transmitted as the transmission wave T and the reception signal received as the reflected wave R. In the one embodiment, the operation described above may be performed by the control unit 10 of the electronic device 1.

The distance FFT processing unit 11 can estimate a distance to the predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The results (for example, distance information) of the distance FFT processing performed by the distance FFT processing unit 11 may be supplied to the velocity FFT processing unit 12. The results of the distance FFT processing performed by the distance FFT processing unit 11 may also be supplied to the object detecting unit 14, etc.

The velocity FFT processing unit 12 estimates a relative velocity between the mobility device 100 equipped with the electronic device 1 and the object 200 on the basis of the beat signals on which the distance FFT processing has been performed by the distance FFT processing unit 11. The velocity FFT processing unit 12 may include a processing unit that performs fast Fourier transform, for example. In this case, the velocity FFT processing unit 12 may be constituted by any circuit, any chip, or the like that performs fast Fourier transform (FFT). The velocity FFT processing unit 12 may preform Fourier transform other than fast Fourier transform.

The velocity FFT processing unit 12 further performs FFT processing (hereinafter, appropriately referred to as "velocity FFT processing") on each beat signal on which the distance FFT processing has been performed by the distance FFT processing unit 11. For example, the velocity FFT processing unit 12 may perform the FFT processing on a complex signal supplied from the distance FFT processing unit 11. The velocity FFT processing unit 12 can estimate a relative velocity to the predetermined object on the basis of a subframe (for example, the subframe 1 illustrated in FIG. 3) including chirp signals. When the distance FFT processing is performed on the beat signal in the above-described manner, a plurality of vectors can be generated. The velocity FFT processing unit 12 can estimate a relative velocity to the predetermined object by determining a phase of a peak in a result of the velocity FFT processing performed on the plurality of vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted.

Results (for example, velocity information) of the velocity FFT processing performed by the velocity FFT processing unit 12 may be supplied to the angle-of-arrival estimating unit 13. The results of the velocity FFT processing performed by the velocity FFT processing unit 12 may also be supplied to the object detecting unit 14, etc.

The angle-of-arrival estimating unit 13 estimates a direction from which the reflected wave R arrives from the predetermined object 200 on the basis of the results of the velocity FFT processing performed by the velocity FFT processing unit 12. The electronic device 1 can estimate the direction from which the reflected wave R arrives by receiving the reflected wave R from the plurality of reception antennas 31. For example, the plurality of reception antennas 31 are arranged at a predetermined interval. In this case, the transmission wave T transmitted from each of the transmission antennas 25 is reflected off the predetermined object 200 to become the reflected wave R. Each of the plurality of reception antennas 31 arranged at the predetermined interval receives the reflected wave R. The angle-of-arrival estimating unit 13 can estimate the direction from which the reflected wave R arrives at each of the plurality of reception antennas 31 on the basis of the phase of the reflected wave R received by the reception antenna 31 and a difference in path of the reflected wave R. That is, the electronic device 1 can measure (estimate) the angle of arrival $\theta$ illustrated in FIG. 1 on the basis of the results of the velocity FFT processing.

Various techniques for estimating a direction from which the reflected wave R arrives on the basis of a result of velocity FFT processing have been proposed. For example, MUSIC (MUltiple SIgnal Classification), ESPRIT (Estimation of Signal Parameters via Rotational Invariance Technique), and the like are known as known arriving direction estimation algorithms. Thus, more detailed description of the known techniques is appropriately simplified or omitted. Information (angle information) of the angle of arrival $\theta$ estimated by the angle-of-arrival estimating unit 13 may be supplied to the object detecting unit 14.

The object detecting unit 14 detects an object located in a range in which the transmission waves T are transmitted, on the basis of the information supplied from at least any of the distance FFT processing unit 11, the velocity FFT processing unit 12, and the angle-of-arrival estimating unit 13. The object detecting unit 14 may perform detection of an object by performing, for example, clustering processing on the basis of the supplied distance information, velocity information, and angle information. For example, DBSCAN (Density-based spatial clustering of applications with noise) or the like is known as an algorithm used in clustering of data. In the clustering processing, for example, average power of points constituting the detected object may be calculated. The distance information, the velocity information, the angle information, and power information of the object detected by the object detecting unit 14 may be supplied to the detection range determining unit 15. The distance information, the velocity information, the angle information, and the power information of the object detected by the object detecting unit 14 may be supplied to the ECU 50. In this case, when the mobility device 100 is an automobile, communication may be performed using a communication interface such as a CAN (Controller Area Network), for example.

The detection range determining unit 15 determines a range (hereinafter, also referred to as an "object detection range") in which an object that reflects the transmission wave T is to be detected on the basis of the transmission signal and the reception signal. The detection range determining unit 15 may determine the object detection range on the basis of an operation performed by a driver or the like of the mobility device 100 equipped with the electronic device 1, for example. For example, the detection range determining unit 15 may determine the object detection range suitable for parking assist when a parking assist button is operated by a driver or the like of the mobility device 100. The detection range determining unit 15 may determine the object detection range on the basis of an instruction from the ECU 50, for example. For example, when the ECU 50 determines that the mobility device 100 is to travel backward, the detection range determining unit 15 may determine, on the basis of an instruction from the ECU 50, the object detection range suitable when the mobility device 100 travels backward. The detection range determining unit 15 may determine the object detection range on the basis of a change in an operation state for steering, an accelerator, gears, or the like of the mobility device 100, for example. The detection range determining unit 15 may determine the object detection range on the basis of a result of detection of an object performed by the object detecting unit 14.

The parameter setting unit 16 sets various parameters that define a transmission signal and a reception signal with which an object that reflects the transmission wave T as the reflected wave R is to be detected. That is, the parameter setting unit 16 sets various parameters for transmitting the transmission wave T from each transmission antenna 25 and various parameters for receiving the fleeted wave R from each reception antenna 31.

In particular, in the one embodiment, the parameter setting unit 16 may set various parameters related to transmission of the transmission wave T and reception of the reflected wave R in order to detect an object in the object detection range described above. For example, the parameter setting unit 16 may define a range or the like in which the reflected wave R is desirably received in order to detect the object located in the object detection range by receiving the reflected wave R. For example, the parameter setting unit 16 may define a range or the like to which a beam of the transmission waves T is desirably directed in order to detect an object located in the object detection range by transmitting the transmission waves T from the plurality of transmission antennas 25. The parameter setting unit 16 may also set various parameters for transmitting the transmission wave T and receiving the reflected wave R.

The various parameters set by the parameter setting unit 16 may be supplied to the signal generating unit 21. Thus, the signal generating unit 21 can generate the transmission signal to be transmitted as the transmission waves T on the basis of the various parameters set by the parameter setting unit 16. The various parameters set by the parameter setting unit 16 may be supplied to the object detecting unit 14. Thus, the object detecting unit 14 can perform object detection processing in the object detection range determined on the basis of the various parameters set by the parameter setting unit 16.

The ECU 50 included in the electronic device 1 according to the one embodiment is capable of controlling the functional units of the mobility device 100 and also controlling operations of the entire mobility device 100. In the electronic device 1 according to the one embodiment, the ECU 50 may control the plurality of sensors 5 as described below. To provide control and processing capabilities for executing various functions, the ECU 50 may include at least one processor, for example, a CPU (Central Processing Unit). The ECU 50 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the ECU 50 may be configured as, for example, a CPU and a program executed by the CPU. The ECU 50 may appropriately include a memory required for operations of the ECU 50. At least part of the functions of the control unit 10 may be functions of the ECU 50, or at least part of the functions of the ECU 50 may be functions of the control unit 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, by including the two transmission antennas 25 and the four reception antennas 31, the electronic device 1 can be regarded to include a virtual antenna array that is virtually constituted by eight antennas. As described above, the electronic device 1 may receive the reflected wave R of 16 subframes illustrated in FIG. 3 by using, for example, the eight virtual antennas.

Figure 4:
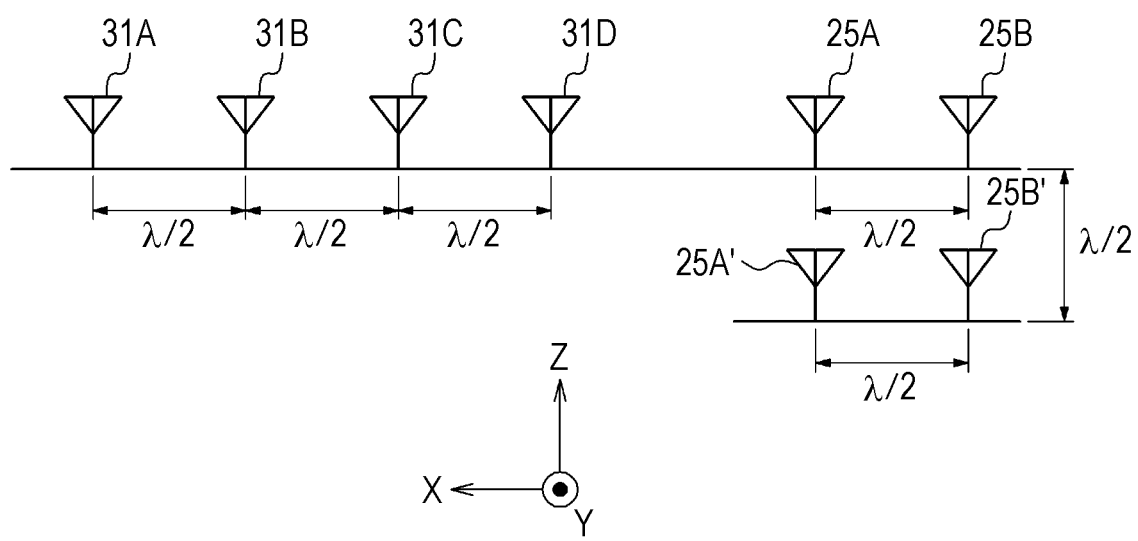
FIG. 4 is a diagram illustrating an example of arrangement of transmission antennas and reception antennas in the electronic, device according to the one embodiment.

FIG. 4 is a diagram illustrating an example of the arrangement of the transmission antennas and the reception antennas in the sensor of the electronic device according to the one embodiment.

As illustrated in FIG. 4, the sensor 5 of the electronic device 1 according to the one embodiment may include, for example, two transmission antennas 25A and 25A'. As illustrated in FIG. 4, the sensor 5 of the electronic device 1 according to the one embodiment may include four reception antennas 31A, 31B, 31C, and 31D.

The four reception antennas 31A, 31B, 31C, and 31D are arranged in the horizontal direction (in an X-axis direction) at an interval of $\lambda/2$, where $\lambda$ denotes a wavelength of the transmission wave T. By arranging the plurality of reception antennas 31 in the horizontal direction and receiving the transmission wave T with the plurality of reception antennas 31 in this manner, the electronic device 1 can estimate the direction from which the reflected wave R arrives. The wavelength $\lambda$ of the transmission wave T may be a wavelength of the transmission wave T having a center frequency of 79 GHz when a frequency band of the transmission wave T is, for example, from 77 GHz to 81 GHz.

The two transmission antennas 25A and 25A' are arranged in a vertical direction (a Z-axis direction) at an interval of $\lambda/2$, where $\lambda$ denotes the wavelength of the transmission wave T. By arranging the plurality of transmission antennas 25 in the vertical direction and transmitting the transmission waves T with the plurality of transmission antennas 25 in this manner, the electronic device 1 can change the direction of the beam of the transmission waves T in the vertical direction.

As illustrated in FIG. 4, the sensor 5 of the electronic device 1 according to the one embodiment may include, for example, four transmission antennas 25A, 25A', 25B, and 25B'.

As illustrated in FIG. 4, the two transmission antennas 25A and 25B are arranged in the horizontal direction (the X-axis direction) at an interval of $\lambda/2$, where $\lambda$ denotes the wavelength of the transmission wave T. As illustrated in FIG. 4, the two transmission antennas 25A' and 25B' are arranged also in the horizontal direction (the X-axis direction) at an interval of $\lambda/2$, where $\lambda$ denotes the wavelength of the transmission wave T. By arranging the plurality of transmission antennas 25 in the horizontal direction and transmitting the transmission waves T with the plurality of transmission antennas 25 in this manner, the electronic device 1 can change the direction of the beam of the transmission waves T also in the horizontal direction.

On the other hand, as illustrated in FIG. 4, the two transmission antennas 25B and 25B' are arranged in the vertical direction (the Z-axis direction) at an interval of $\lambda/2$, where $\lambda$ denotes the wavelength of the transmission wave T. In the arrangement illustrated in FIG. 4, by arranging the plurality of transmission antennas 25 in the vertical direction and transmitting the transmission waves T with the plurality of transmission antennas 25 in this manner, the electronic device 1 can change the direction of the beam of the transmission waves T in the vertical direction.

When the electronic device 1 according to the one embodiment performs beamforming of the transmission waves T transmitted from the plurality of transmission antennas 25, the plurality of transmission waves T may be set in phase in a predetermined direction on the basis of a difference between paths along which the transmission waves T are transmitted. In the electronic device 1 according to the one embodiment, in order to set the individual transmission waves T in phase in a predetermined direction, for example, the phase control units 23 may control the phase of at least one of the transmission waves transmitted from the plurality of transmission antennas 25.

An amount of phase to be controlled to set the plurality of transmission waves T in phase in a predetermined direction may be stored in the storage unit 40 in association with the predetermined direction. That is, a relationship between a direction of the beam and an amount of phase for beamforming may be stored in the storage unit 40.

Such a relationship may be determined on the basis of actual measurement performed in a test environment, for example, before the electronic device 1 performs detection of an object. When such a relationship is not stored in the storage unit 40, a relationship appropriately estimated by the phase control units 23 on the basis of predetermined data such as past measurement data may be used. When such a relationship is not stored in the storage unit 40, the phase control units 23 may acquire an appropriate relationship by connecting to an external device via a network, for example.

In the electronic device 1 according to the one embodiment, at least one of the control unit 10 and the phase control units 23 may perform control for performing beamforming of the transmission waves T transmitted from the plurality of transmission antennas 25. In the electronic device 1 according to the one embodiment, a functional unit including at least the phase control units 23 is also referred to as a transmission control unit.

As described above, in the electronic device 1 according to the one embodiment, the transmission antenna 25 may include a plurality of transmission antennas. In the electronic device 1 according to the one embodiment, the reception antenna 31 may also include a plurality of reception antennas. In the electronic device 1 according to the one embodiment, the transmission control unit (for example, the phase control units 23) may perform control such that the transmission waves T transmitted from the plurality of transmission antennas 25 form a beam in a predetermined direction (beamforming). In the electronic device 1 according to the one embodiment, the transmission control unit (for example, the phase control units 23) may form a beam in a direction toward the object detection range.

In the electronic device 1 according to the one embodiment, the transmission antennas 25 may include a plurality of transmission antennas 25 arranged to include a vertical direction component as described above. In this case, in the electronic device 1 according to the one embodiment, the phase control units 23 (transmission control unit) may change the direction of the beam to the direction toward the object detection range with the vertical direction component included.

In the electronic device 1 according to the one embodiment, the transmission antennas 25 may include a plurality of transmission antennas 25 arranged to include a horizontal direction component as described above. In this case, in the electronic device 1 according to the one embodiment, the phase control units 23 (transmission control unit) may change the direction of the beam to the direction toward the object detection range with the horizontal direction component included.

In the electronic device 1 according to the one embodiment, the transmission control unit (for example, the phase control units 23) may form a beam in a direction that covers at least part of the object detection range. In the electronic device 1 according to the one embodiment, the transmission control unit (for example, the phase control units 23) may control the phase of at least one of the plurality of transmission waves such that the transmission waves T each transmitted from a respective one of the plurality of transmission antennas 25 are in phase in a predetermined direction.

The electronic device 1 according to the one embodiment is capable of calculating a phase compensation value on the basis of frequency information of wide frequency band signals (for example, FMCW signals) output from the plurality of transmission antennas 25 and performing frequency-dependent phase compensation for each of the plurality of transmission antennas. Consequently, the electronic device 1 according to the one embodiment can perform, with high accuracy, beamforming in a particular direction in the entire frequency band which the transmission signal can have.

Such beamforming can extend an object detectable distance in a particular direction in which object detection is needed. The beamforming described above can reduce a reflected signal from an unnecessary direction. Therefore, the accuracy of detecting the distance and/or the angle can be improved.

Figure 5:
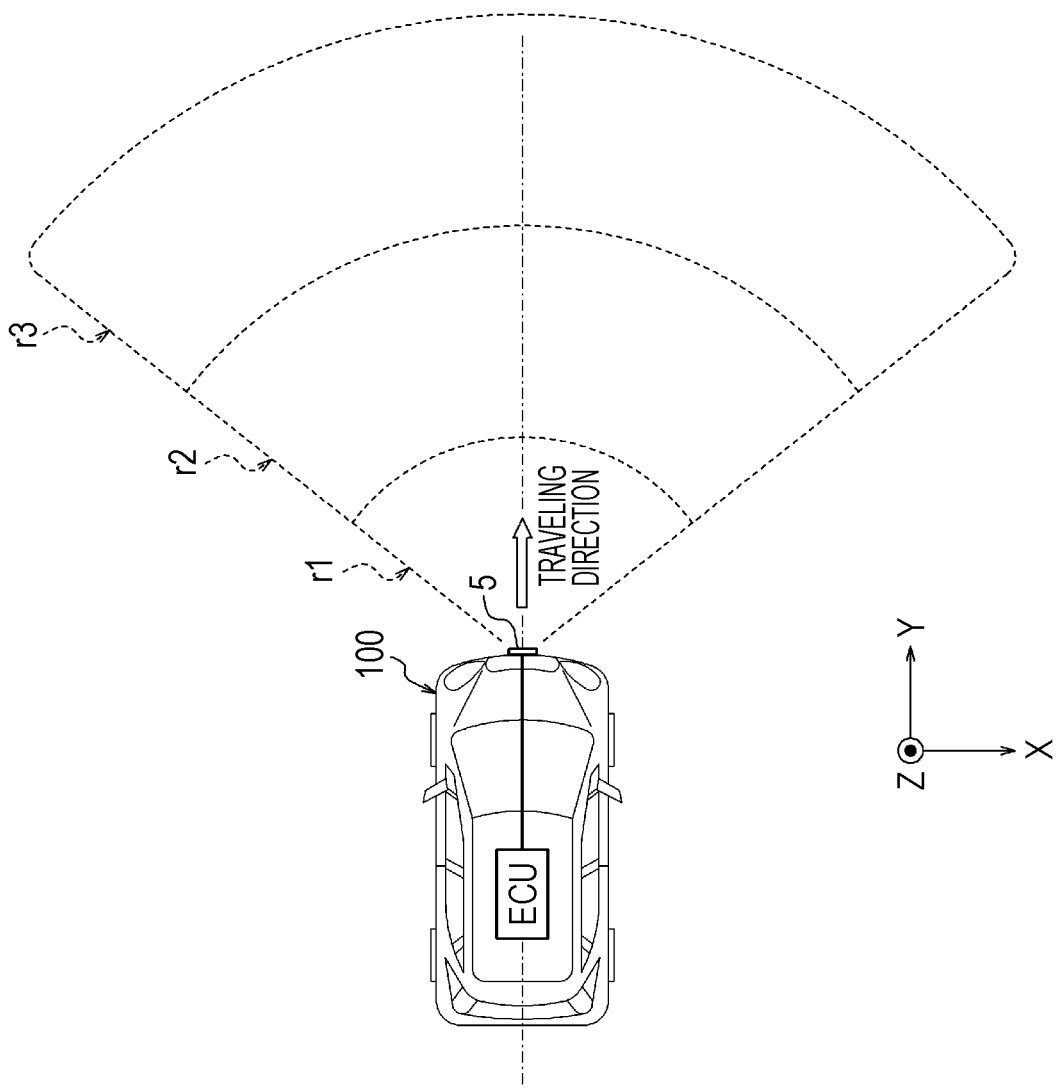
FIG. 5 is a diagram for describing an operation of the electronic device according to the one embodiment.

FIG. 5 is a diagram illustrating types of a detection distance of a radar implemented by the electronic device 1 according to the one embodiment.

As described above, the electronic device 1 according to the one embodiment is capable of clipping the object detection range and/or performing beamforming of the transmission waves. By employing at least one of clipping of the object detection range and beamforming of the transmission waves, the electronic device 1 is capable of defining a distance range in which an object can be detected on the basis of the transmission signal and the reception signal.

As illustrated in FIG. 5, the electronic device according to the one embodiment is capable of performing detection of an object in a range r1, for example. The range r1 illustrated in FIG. 5 may be a range in which detection of an object can be performed by an ultra-short range radar (USRR), for example. As illustrated in FIG. 5, the electronic device 1 according to the one embodiment is also capable of performing detection of an object in a range r2, for example.

The range r2 illustrated in FIG. 5 may be a range in which detection of an object can be performed by a short-range radar (SRR), for example. As illustrated in FIG. 5, the electronic device 1 according to the one embodiment is further capable of performing detection of an object in a range r3, for example. The range r3 illustrated in FIG. 5 may be a range in which detection of an object can be performed by a mid-range radar (MRR), for example. As described above, the electronic device 1 according to the one embodiment is capable of performing detection of an object by appropriately switching the range to any of the range r1, the range r2, and the range r3, for example. In such radars having different detection distances, the distance measurement accuracy tends to decrease as the detection distance increases.

As described above, in the electronic device 1 according to the one embodiment, the electronic device may set the distance range in which detection of an object is performed on the basis of the transmission signal and the reception signal, in accordance with the object detection range.

Connections of the sensors 5 and the ECU 50 in the electronic device 1 is described next.

Figure 6:
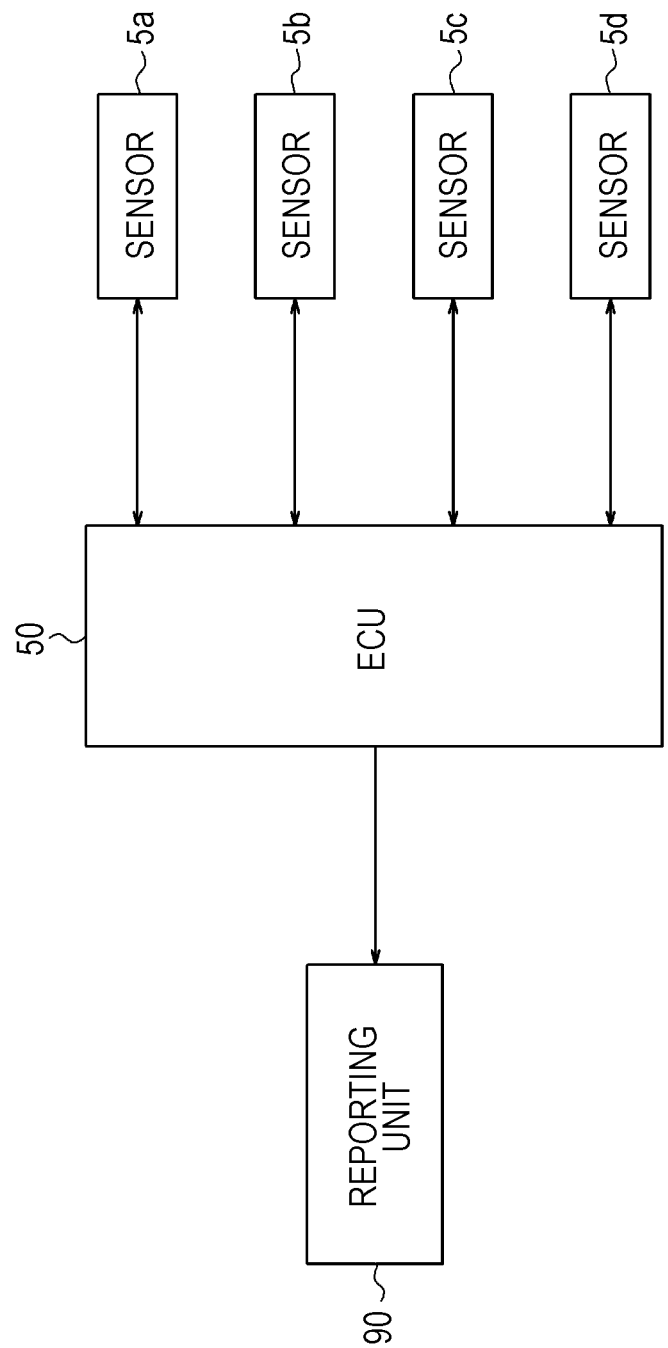
FIG. 6 is a block diagram for describing connections in the electronic device according to one embodiment.

FIG. 6 is a diagram illustrating an example of connections of the sensors 5 and the ECU 50 in the electronic device according to the one embodiment.

FIG. 6 is a diagram schematically illustrating connections of the sensors 5 and the mobility device 100 illustrated in FIG. 1, for example. The electronic device 1 according to the one embodiment includes the plurality of sensors 5. As illustrated in FIG. 6, the plurality of sensors 5 may include four sensors such as sensors 5a, 5b, 5c, and 5d, for example. When the plurality of sensors such as the sensors 5a, 5b, 5c, and 5d, for example, are not distinguished from each other in the electronic device 1 according to the one embodiment, the plurality of sensors are hereinafter simply referred to as "sensors 5". In FIG. 2, an example in which only one sensor 5 is connected to the ECU 50 has been described. In FIG. 6, an example in which four sensors 5 are connected to the ECU 50 is described.

As illustrated in FIG. 6, in the one embodiment, each of the plurality of sensors 5 is connected to the ECU 50. The ECU 50 may be connected to, for example, steering, gears, and/or the like used for causing the mobility device 100 to operate. The ECU 50 may be connected to another functional unit, for example, a brake and/or the like, used for causing the mobility device 100 to operate. The ECU 50 may be connected to any functional unit used for causing the mobility device 100 to operate, or to any functional unit controlled in the mobility device 100. As illustrated in FIG. 6, the ECU 50 may also be connected to a reporting unit 90. In the one embodiment, these functional units can communicate various kinds of information via respective connections.

Each of the plurality of sensors 5 illustrated in FIG. 6 may have the same and/or similar configuration as that of the sensor 5 illustrated in FIG. 2. Each of the plurality of sensors 5 illustrated in FIG. 6 may be connected to the ECU 50 and thus controlled individually by the ECU 50.

The ECU 50 is capable of performing various kinds of detection such as detection of an object located around the mobility device 100, on the basis of information output from the plurality of sensors 5. The ECU 50 is also capable of controlling each of the plurality of sensors 5 when performing the various kinds of detection described above. In the one embodiment, the ECU 50 may function as a determination unit that determines a shift in orientation of at least any of the plurality of sensors 5. Hereinafter, the ECU 50 may also be referred to as the "determination unit 50" as appropriate. The shift in orientation of at least any of the plurality of sensors 5, which is determined by the determination unit 50, is further described below.

The ECU (Electronic Control Unit)) 50 is capable of acquiring states of various functional units, such as steering and gears, of the mobility device 100 when the mobility device 100 is an automobile, for example. The ECU 50 may be connected to functional units such as a throttle and/or a brake in addition to steering and gears. The throttle, the brake, and/or the like of the mobility device 100 may be the same as and/or similar to those used for changing the speed of a common automobile, for example. In the one embodiment, the throttle, the brake, and/or like of the mobility device 100 may be operated by a driver or may be operated by the ECU 50 in automated driving.

The reporting unit 90 reports predetermined information to a driver or the like of the mobility device 100. The reporting unit 90 may be any functional unit that stimulates at least any of the sense of hearing, the sense of sight, and the sense of touch of the driver of the mobility device 100 with sound, voice, light, text, video, vibration, and the like, for example. Specifically, the reporting unit 90 may be, for example, a buzzer, a speaker, a light-emitter such as an LED, a display such as an LCD, and a touch presenting unit such as a vibrator. In the one embodiment, the reporting unit 90 reports information on a detection result of an object located around the mobility device 100 to the driver or the like of the mobility device 100, for example. For example, in the one embodiment, in response to detection of an object located around the mobility device 100, the reporting unit 90 that reports visual information may report detection of the object to the driver of the mobility device through light emission or an indication. In addition, in the one embodiment, in response to detection of an object located around the mobility device 100, the reporting unit 90 that reports auditory information may report detection of the object to the driver of the mobility device by sound or voice. Further, in the one embodiment, the reporting unit 90 may report information on a result of determining a shift in orientation of at least any of the plurality of sensors 5 to the driver or the like of the mobility device 100, for example.

When the mobility device 100 is driven by a driver, the ECU 50 is capable of detecting states of various functional units of the mobility device 100. For example, the ECU 50 is capable of detecting a turn angle (steering angle) of steering of the mobility device 100. For example, the ECU 50 is capable of detecting which of forward traveling or backward traveling the gear of the mobility device 100 is operated in and which gear the gearbox is operated in. For example, the ECU 50 may also detect ON/OFF of a throttle and a brake of the mobility device 100, degrees of the throttle and the brake, and so on.

In addition, as described above, when the mobility device 100 is driven by a driver, the reporting unit 90 may report information on a result of determining a shift in orientation of at least any of the plurality of sensors 5. In this case, the control unit 10 and/or the ECU 50 may control the reporting unit 90 to report the information on the result of determining a shift in orientation of at least any of the plurality of sensors 5.

On the other hand, when the mobility device 100 is driven by automated driving, the ECU 50 is capable of controlling various functional units of the mobility device 100. Automated driving may refer to, for example, automated driving of levels 1 to 5 defined by the Japanese Government and the National Highway Traffic Safety Administration (NHTSA).

For example, the ECU 50 may automatically control steering of the mobility device 100 in accordance with detection results obtained by the sensors 5. The ECU 50 may automatically control the gears of the mobility device 100 (to travel forward/backward, for example) in accordance with detection results obtained by the sensors 5. For example, the ECU 50 may automatically control the gear in which the gearbox is operated in, in accordance with detection results obtained by the sensors 5. For example, the ECU 50 may also automatically control ON/OFF of a throttle and a brake of the mobility device 100, degrees of the throttle and the brake, and so on in accordance with detection results obtained by the sensors 5.

As described above, the electronic device 1 may include the ECU 50 that controls the operation of the mobility device 100. In this case, the plurality of sensors 5 may supply information on a result of detecting an object located around the mobility device 100 to the ECU 50. The ECU 50 may then determine a shift in orientation of at least any of the plurality of sensors 5 on the basis of the information supplied from at least any of the plurality of sensors 5.

A shift in orientation of the plurality of sensors 5 of the electronic device 1 according to the one embodiment is described next.

In general, for example, when a sensor, such as a radar device, that detects a location of an object is installed on a mobility device such as an automobile, the sensor is calibrated at the time of shipment from a factory to adjust the sensor so that the correct location is to be detected, for example. For example, when a plurality of sensors are installed on a body of a mobility device such as an automobile, the sensors can be adjusted in terms of hardware such that the orientation in which (angle at which) each sensor is installed on the mobility device is adjusted. The sensors can also be calibrated in terms of software such that a relative positional relationship between an object detected by each of the sensors thus installed and the mobility device is correct. By performing adjustment and calibration in this way, information on the object located around the mobility device can be correctly grasped on the basis of detection results obtained by the plurality of sensors.

However, even if the adjustment and calibration are appropriately performed in the above-described manner, it is expected that the installed orientation (angle) of the sensor changes to an extent because the sensor receives a physical impact. For example, another mobility device or the like may come into contact with the sensor of the traveling mobility device, or the sensor may be scraped by the wall when the mobility device is parked. In such a case, the installed orientation (angle) of the sensor installed on the body or the bumper may change to an extent. In addition, even if the sensor does not directly receive a physical impact, it is expected that the installed orientation (angle) of the sensor may change to an extent because the sensor keeps receiving vibration while the mobility device travels over a certain distance, for example. If the installed orientation (angle) of the sensor changes because of any reason, the sensor is no longer able to correctly detect the location of the object.

To cope with such a circumstance, means for detecting the installed orientation (angle) of the sensor may be separately provided, and a change in installed orientation (angle) of tie sensor may be detected. However, the electronic device 1 according to the one embodiment determines, with the plurality of sensors, whether the installed orientations (angles) of the plurality of sensors are appropriate. Hereinafter, the installed orientation (angle) of a sensor may also be referred to as an "orientation of the sensor". In addition, a change in installed orientation (angle) of the sensor, that is, a change in orientation of the sensor may also be referred to as a "shift in orientation of the sensor". In addition, the one embodiment, a shift in orientation of the sensor may be a shift from the installed orientation of the sensor, for example.

An operation of the electronic device 1 according to the one embodiment is described next.

The electronic device 1 according to the one embodiment may include the plurality of sensors 5. In the electronic device 1 according to the one embodiment, the ECU 50 may control the plurality of sensors 5 independently of each other. Control of the plurality of sensors 5 may refer to, for example, changing the object detection ranges of the sensors 5 or the transmission-wave reachable distances of the sensors 5. Control of the plurality of sensors 5 may also refer to clipping the object detection ranges of the sensors 5 and/or controlling beamforming of transmission waves of the sensors 5.

Figure 7:
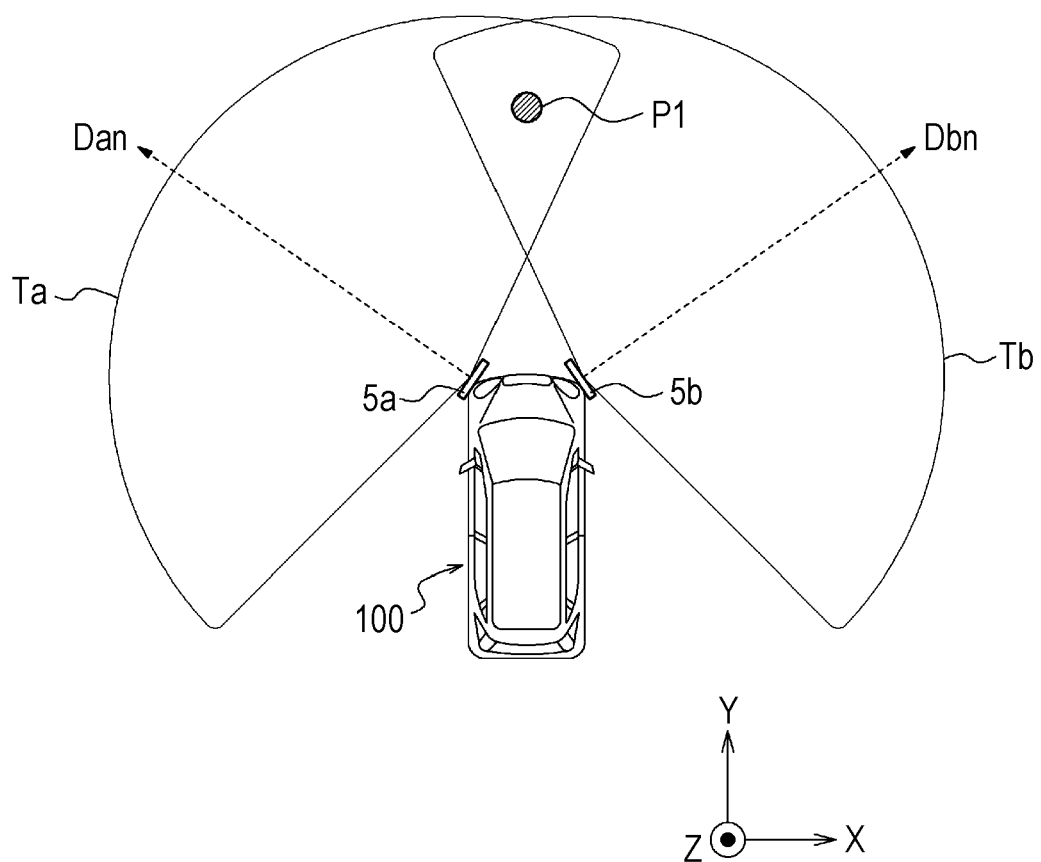
FIG. 7 is a diagram for describing an operation of the electronic device according to the one embodiment.

First, an example in which the electronic device 1 includes two sensors 5 as the plurality of sensors 5 is described. FIG. 7 is a diagram for describing an example of an operation of the electronic device 1 according to the one embodiment. When the electronic device 1 according to the one embodiment includes two sensors 5, the two sensors 5 may be installed at two positions of the mobility device 100 as illustrated in FIG. 7.

In the example illustrated in FIG. 7, the sensor 5a is installed in a left front portion of the mobility device 100, and the sensor 5b is installed in a right front portion of the mobility device 100. In addition, as illustrated in FIG. 7, the sensor 5a in the left front portion of the mobility device 100 faces in a direction Dan, and the sensor 5b in the right front portion of the mobility device 100 faces in a direction Dbn. Thus, in the electronic device 1 according to the one embodiment, the plurality of sensors 5 may be installed in predetermined orientations at different positions. Hereinafter, in the example illustrated in FIG. 7, an object detection range of the sensor 5a may also be referred to as a detection range Ta. In addition, an object detection range of the sensor 5b may also be referred to as a detection range Tb. As illustrated in FIG. 7, the sensors 5a and 5b have detection ranges having predetermined central angles with the directions Dan and Dbn at the center, respectively. In addition, in the example illustrated in FIG. 7, it may be assumed that a transmission wave Ta is transmitted from the sensor 5a and a transmission wave Tb is transmitted from the sensor 5b.

In addition, in the electronic device 1 according to the one embodiment, the sensors 5a and 5b are installed such that the detection ranges of the respective sensors 5 partially overlap as illustrated in FIG. 7. In the example illustrated in FIG. 7, a portion of a right end (end in a clockwise direction) of the detection range Ta of the sensor 5a and a portion of a left end (end in a counterclockwise direction) of the detection range Tb of the sensor 5b have an overlap. That is, both the sensor 5a and the sensor 5b can detect an object in this overlapping portion of the detection range Ta and the detection range Tb. For example, an object P1 illustrated in FIG. 7 is present at a location represented by coordinates (x1, y1). In this case, the object P1 is located in the detection range Ta of the sensor 5a and also in the detection range Tb of the sensor 5b. Thus, both the sensor 5a and the sensor 5b can detect the object P1. As described above, in the electronic device 1 according to the one embodiment, a first sensor 5a and a second sensor 5b may be installed in predetermined orientations such that an object detection range Ta of the first sensor 5a and an object detection range Tb of the second sensor 5b partially overlap.

As illustrated in FIG. 7, in the electronic device 1 according to the one embodiment, after the sensors 5a and 5b are installed in correct orientations, calibration of the sensors 5 may be then performed. Specifically, for example, calibration is performed such that the locations detected for the object P1 by the sensor 5a and the sensor 5b indicate the same location in the electronic device 1 as illustrated in FIG. 7. That is, for example, suppose that the coordinates of the object P1 detected by the sensor 5a indicate the point (x1, y1) in the front direction of the mobility device 100. In this case, calibration is performed such that the coordinates of the object P1 detected by the sensor 5b also indicate the point (x1, y1) in the front direction of the mobility device 100. If such calibration is performed, the object P1 is detected by both the sensor 5a and the sensor 5b to be at the same location (x1, y1) in the electronic device 1.

The adjustment of the orientations of the sensors 5 and the calibration of the sensors 5 illustrated in FIG. 7 may be performed, for example, at the time of shipment of the mobility device 100 from a factory or at the time of various inspections such as a vehicle inspection. In this case, for example, a corner reflector or the like having a high reflectivity may be used as the object P1. The object P1 such as a corner reflector may be disposed at a known point (x1, y1), and may be detected by the sensors 5a and 5b. In this manner, calibration may be performed.

On the other hand, the timing at which the adjustment of the orientations of the sensors 5 and the calibration of the sensors 5 illustrated in FIG. 7 are performed is not limited to at the time of shipment of the mobility device 100 from a factory or at the time of various inspections, and may be performed at another timing. For example, the adjustment of the orientations of the sensors 5 and the calibration of the sensors 5 may be performed in response to the sensors 5a and 5b detecting an object suitable for the object P1 while the mobility device 100 is traveling normally. The timing at which the adjustment of the orientations of the sensors 5 and the calibration of the sensors 5 illustrated in FIG. 7 are performed may be various timings. For example, as such a timing, other cases such as a case where the mobility device 100 has traveled over a certain distance, a case where the mobility device 100 has detected a vibration of a predetermined value or greater with an acceleration sensor and/or a gyrosensor, a case where a predetermined time has passed from the previous calibration, a case where a user inputs a calibration start instruction, and a case where the mobility device 100 has detected an acceleration or speed of a predetermined value or greater with a velocity sensor and/or a gyrosensor may be combined in any manner. The case where the mobility device 100 has detected a vibration of a predetermined value or greater with an acceleration sensor and/or a gyrosensor may include, for example, a case where shaking of a predetermined frequency or higher has been detected.

After the adjustment of the orientations of the sensors 5 and the calibration of the sensors 5 are performed as illustrated in FIG. 7, the electronic device 1 can detect an object located around the mobility device 100 during normal traveling, for example. That is, the electronic device detects an object located around the mobility device 100, and reports the detection to a driver or the like of the mobility device 100 via the reporting unit 90 or may use the detection for the mobility device 100.

As described above, after the adjustment of the orientations of the sensors 5 and the calibration of the sensors 5 are performed, the orientations of the sensors 5 may shift because of some reasons. For example, suppose that the sensor 5a comes into contact with something and consequently the orientation of the sensor 5a is shifted slightly in a circumstance illustrated in FIG. 7.

Figure 8:
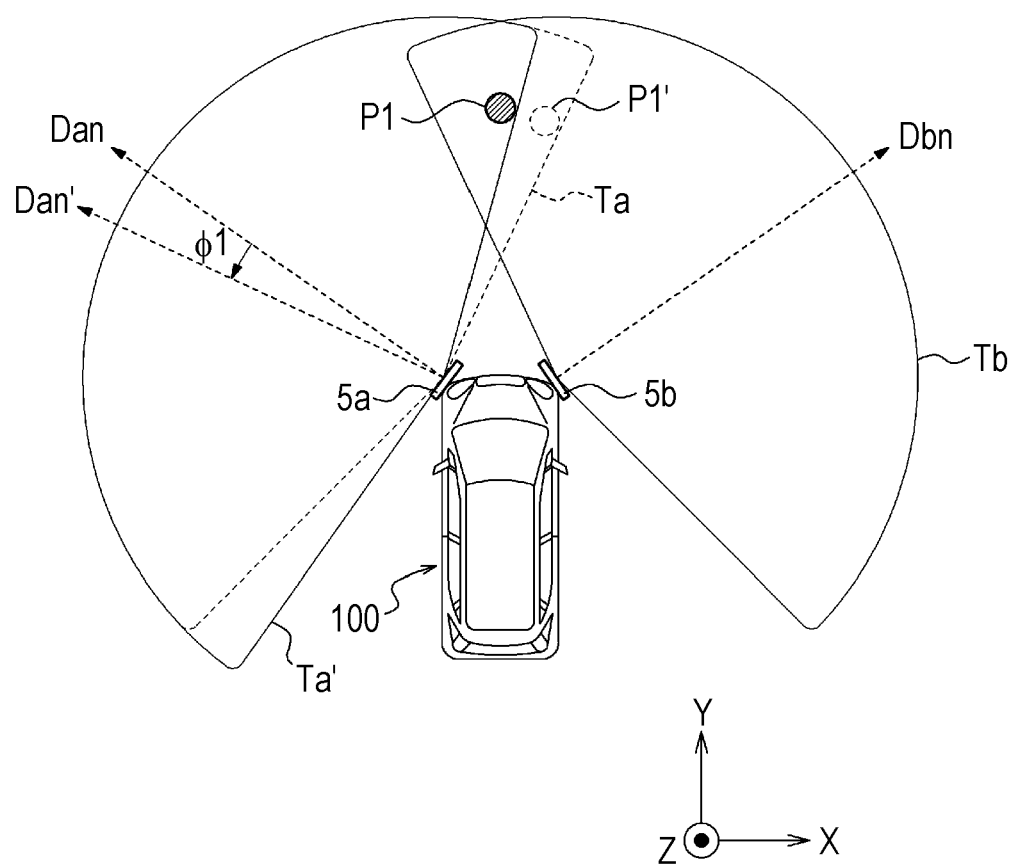
FIG. 8 is a diagram for describing an operation of the electronic device according to the one embodiment.

FIG. 8 is a diagram illustrating a state in which the orientation of the sensor 5a is shifted slightly. For example, suppose that the sensor 5a comes into contact with something and consequently the orientation of the sensor 5a is shifted counterclockwise by $\varphi 1$ as illustrated in FIG. 8. In this case, the orientation of the sensor 5a is shifted from the direction Dan to a direction Dan'. In response to this, the detection range of the sensor 5a is also shifted from the detection range Ta to a detection range Ta' as illustrated in FIG. 8.

As in FIG. 7, it is assumed also in FIG. 8 that the object P1 is at the location (x1, y1) in the front direction of the mobility device 100. In such a circumstance, detecting the object P1 with the sensor 5a and the sensor 5b is discussed. As illustrated in FIG. 8, the locations detected for the object P1 by the sensor 5a and the sensor 5b are not the same location in the electronic device 1. In the detection range Tb, the sensor 5b still detects the object P1 to be at the point (x1, y1). On the other hand, since the detection range Ta is shifted to the detection range Ta', the sensor 5a detects the object P1 to be at a location P1'. Here, it is assumed that coordinates of the location P1' are coordinates (x1', y1°). The location of the object detected by the sensor 5a whose orientation is shifted is identified on the basis of the coordinates allocated in the detection range Ta'. The object P1 that is actually at the location of the coordinates (x1, y1) is detected at the right end (end in the clockwise direction) of the detection range Ta'. This detection range Ta' corresponds to the detection range Ta before the orientation of the sensor 5a is shifted. Thus, the sensor 5a detects the object P1 to be at the right end (end in the clockwise direction) of the detection range Ta, that is, at the location P1' (coordinates (x1', y1°)).

As described above, when the orientation of either the sensor 5a or the sensor 5b is shifted, even if the locations are detected for the same object P1 in the electronic device 1, the locations are not the same. From the above, in the one embodiment, when the sensor 5a and the sensor 5b detect locations for the same object P1, if the locations (for example, coordinates) are not the same, it may be determined that the orientation of one of the sensor 5a and the sensor 5b is shifted. Conversely, in the one embodiment, when the sensor 5a and the sensor 5b detect locations for the same object P1, if the locations (for example, coordinates) are substantially the same, it may be determined that the orientations of the sensor 5a and the sensor 5b are not shifted. Such a determination may be made by the ECU (determination unit) 50, for example. In this case, it is impossible to determine which of the sensor 5a and the sensor 5b is shifted but it is possible to determine that the orientation of one of the sensor 5a and the sensor 5b is shifted. An operation for determining which of the sensor 5a and the sensor 5b is shifted when the orientation of one of the sensor 5a and the sensor 5b is shifted is further described later.

Figure 9:
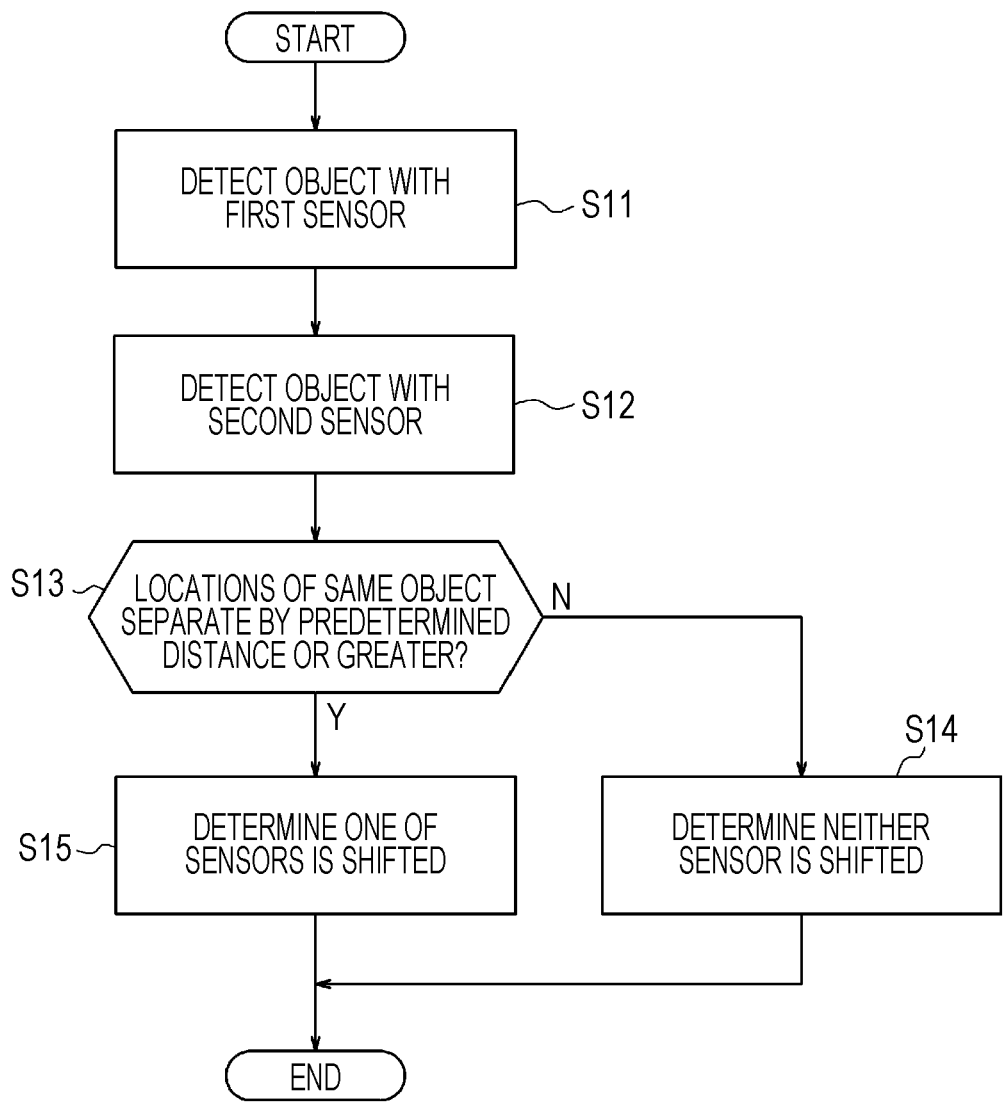
FIG. 9 is a flowchart for describing an operation of the electronic device according to the one embodiment.

FIG. 9 is a flowchart for describing an operation for determining whether the orientation of either of the two sensors is shifted in the electronic device 1 as described in FIG. 8. It is assumed that the adjustment of the orientations of the plurality of sensors 5 and the calibration of the plurality of sensors 5 as described above have been completed at the time point when the operation Illustrated in FIG. 9 starts. In addition, the operation of the electronic device 1 illustrated in FIG. 9 may be controlled by the control unit 10 and/or the ECU (determination unit) 50, for example. The description is given below on the assumption that the operation of the electronic device 1 illustrated in FIG. 9 is controlled by the ECU 50.

In response to the start of the operation illustrated in FIG. 9, the ECU 50 detects an object with a first sensor (for example, the sensor 5a) of the electronic device 1 (step S11). Then, the ECU 50 detects the object with a second sensor (for example, the sensor 5b) of the electronic device 1 (step S12).

Then, the ECU 50 determines whether locations (for example, coordinates) detected for the same object (for example, the object P1) by the first and second sensors are separate by a predetermined distance or greater (step S13). To determine whether the locations for the same object are separate by the predetermined distance or greater in step S13, a distance at which the locations can be regarded as being the same location may be set and stored in, for example, the storage unit 40 or the like in advance. The distance at which the locations can be regarded as being the same location may be determined on the basis of various factors including the object detection accuracy of the electronic device 1. For example, if the distance between the locations detected for the same object by the sensor 5a and the sensor 5b is equal to or less than 5 cm, it may be regarded that the sensor 5a and the sensor 5b detect the same object to be at the same location. In this case, if the distance between the locations detected for the same object by the sensor 5a and the sensor 5b exceeds 5 cm, it may be regarded that the sensor 5a and the sensor 5b detect the same object to be at different locations.

If it is determined in step S13 that the locations for the same object are not separate by the predetermined distance or greater, the ECU 50 determines that neither the first sensor nor the second sensors is shifted (step S14). On the other hand, if it is determined in step S13 that the locations for the same object are separate by the predetermined distance or greater, the ECU 50 determines either the first sensor or the second sensors is shifted (step S15).

As described above, in the one embodiment, the determination unit 50 may determine a shift in orientation of at least any of the plurality of sensors 5 on the basis of object detection results obtained by the plurality of sensors 5. More specifically, the determination unit 50 may determine whether an orientation of at least any of the plurality of sensors 5 is shifted from the installed orientation on the basis of the locations detected for an object by the plurality of sensors 5. The determination unit 50 may determine the shift in orientation of either the first sensor 5a or the second sensor 5b on the basis of detection results of the same object obtained by the first sensor 5a and the second sensor 5b. For example, the determination unit 50 may determine that the orientation of either the first sensor 5a or the second sensor 5b is shifted if the locations detected for the same object by the first second sensor 5a and the second sensor 5b are separate by a predetermined distance or greater.

The electronic device 1 according to the one embodiment can determine, with the plurality of sensors, whether the installed orientations (angles) of the plurality of sensors are appropriate. That is, the electronic device 1 according to the one embodiment need not use, for example, another functional unit for detecting the installed states of the plurality of sensors in determining whether the installed orientations (angles) of the sensors are appropriate.

The electronic device 1 according to the one embodiment is capable of determining whether the installed states of the plurality of sensors are appropriate in the electronic device that performs detection of an object by using the sensors. Thus, the electronic device 1 according to the one embodiment can improve the convenience of the electronic device including the plurality of sensors that receive a reflected wave that is a transmission wave transmitted and reflected off a predetermined object.

A case where the sensor 5a comes into contact with something in the state illustrated in FIG. 7, for example, and consequently the orientation of the sensor 5a is shifted by a greater degree than that in the state illustrated in FIG. 8 is described next.

Figure 10:
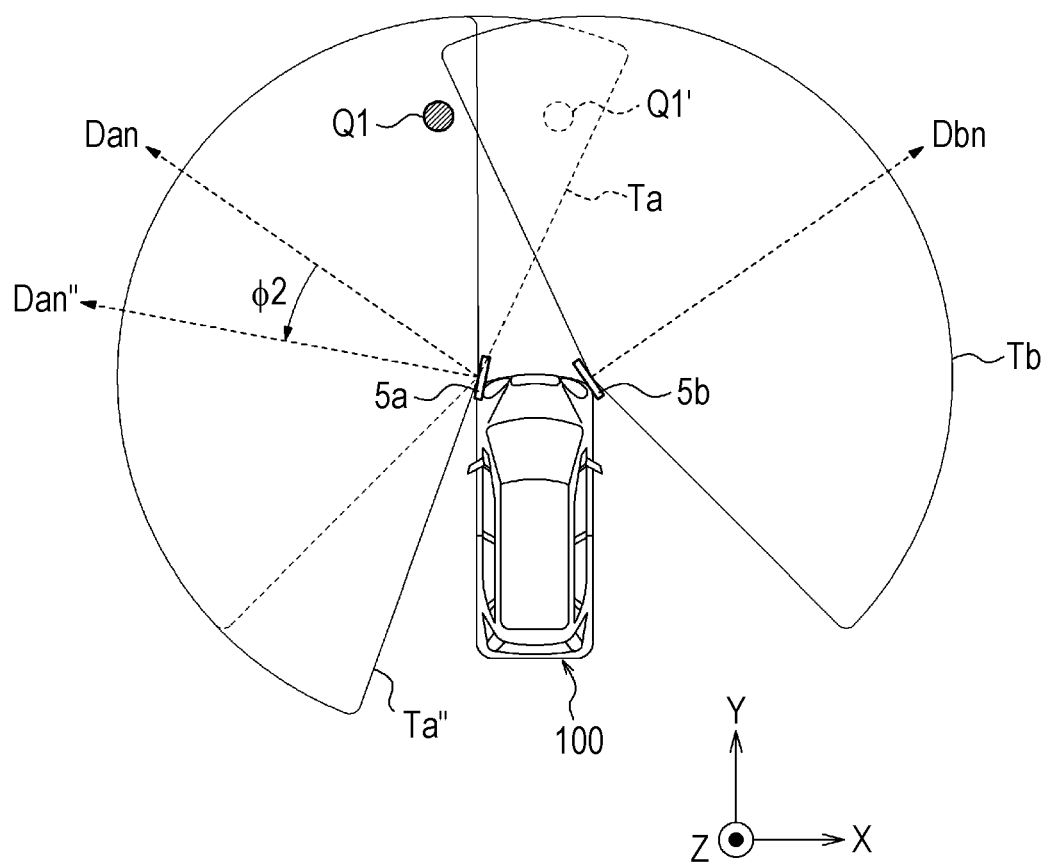
FIG. 10 is a diagram for describing an operation of the electronic device according to the one embodiment.

FIG. 10 is a diagram illustrating a state in which the orientation of the sensor 5a is shifted to an extent. For example, suppose that the sensor 5a comes into contact with something and consequently the orientation of the sensor 5a is shifted counterclockwise by φ2 as illustrated in FIG. 10. In this case, the orientation of the sensor 5a s shifted from the direction Dan to a direction Dan'. In response to this, the detection range of the sensor 5a is also shifted from the detection range Ta to a detection range Ta' as illustrated in FIG. 10.

It is assumed in FIG. 10 that an object Q1 is at a location (x11, y11) on a slightly left side of the front direction of the mobility device 100. In such a circumstance, detecting the object Q1 with the sensor 5a and the sensor 5b is discussed. As illustrated in FIG. 10, the location of the object Q1 is not in the detection range Tb of the sensor 5b. Thus, the sensor 5b is unable to detect the object Q1 in the detection range Tb. On the other hand, since the detection range Ta is shifted to the detection range Ta', the sensor 5a detects the object Q1 to be at a location Q1'. Here, it is assumed that coordinates of the location Q1' are (x11', y11'). The location of the object detected by the sensor 5a whose orientation is shifted is identified on the basis of the coordinates allocated in the detect ion range Ta'. The object Q1 that is actually at the location of the coordinates (x11, y11) is detected to be near the right end (end in the clockwise direction) of the detect ion range Ta'. This detection range Ta' corresponds to the detection range Ta before the orientation of the sensor 5a is shifted. Thus, the sensor 5a detects the object Q1 to be near the right end (end in the clockwise direction) of the detection range Ta, that is, at the location Q1' (coordinates (x11', y11')).

As illustrated in FIG. 10, the location Q1' is a location in the detection range Tb of the sensor 5b and in the detection range Ta of the sensor 5a before the orientation is shifted. That is, the location Q1' is in a partially overlapping region of the object detection ranges (Ta and Tb) of the sensors 5a and 5b when the sensors 5a and 5b are installed in predetermined orientations (in the directions Dan and Dbn) (before the shifting). Thus, if the orientations of the sensors 5a and 5b are not shifted from the orientations (the directions Dan and Dbn) in which the sensors 5a and 5b are installed, both the sensors 5a and 5b detect the object to be at the location Q1'. However, as described above, in this case, the sensor 5a detects the object Q1 (to be at the location Q1' in the electronic device 1) but the sensor 5b does not detect the object Q1.

As described above, there may be a case where an object located in a partially overlapping region of the object detection ranges (Ta and Tb) of the sensors 5a and 5b is detected by one of the sensors 5 but is not detected by the other of the sensors 5. In such a case, it may be determined that the orientation of one of the sensors 5a and 5b is shifted.

Such a determination may be made by the ECU (determination unit) 50, for example. In addition, when the object located in the partially overlapping region of the object detection ranges (Ta and Tb) of the sensors 5a and 5b is detected by both the sensors 5a and 5b, the operation described in FIGS. 8 and 9 may be performed. Also in this case, it is impossible to determine which of the sensor 5a and the sensor 5b is shifted but it is possible to determine that the orientation of one of the sensor 5a and the sensor 5b is shifted. An operation for determining which of the sensor 5a and the sensor 5b is shifted when the orientation of one of the sensor 5a and the sensor 5b is shifted is further described later.

Figure 11:
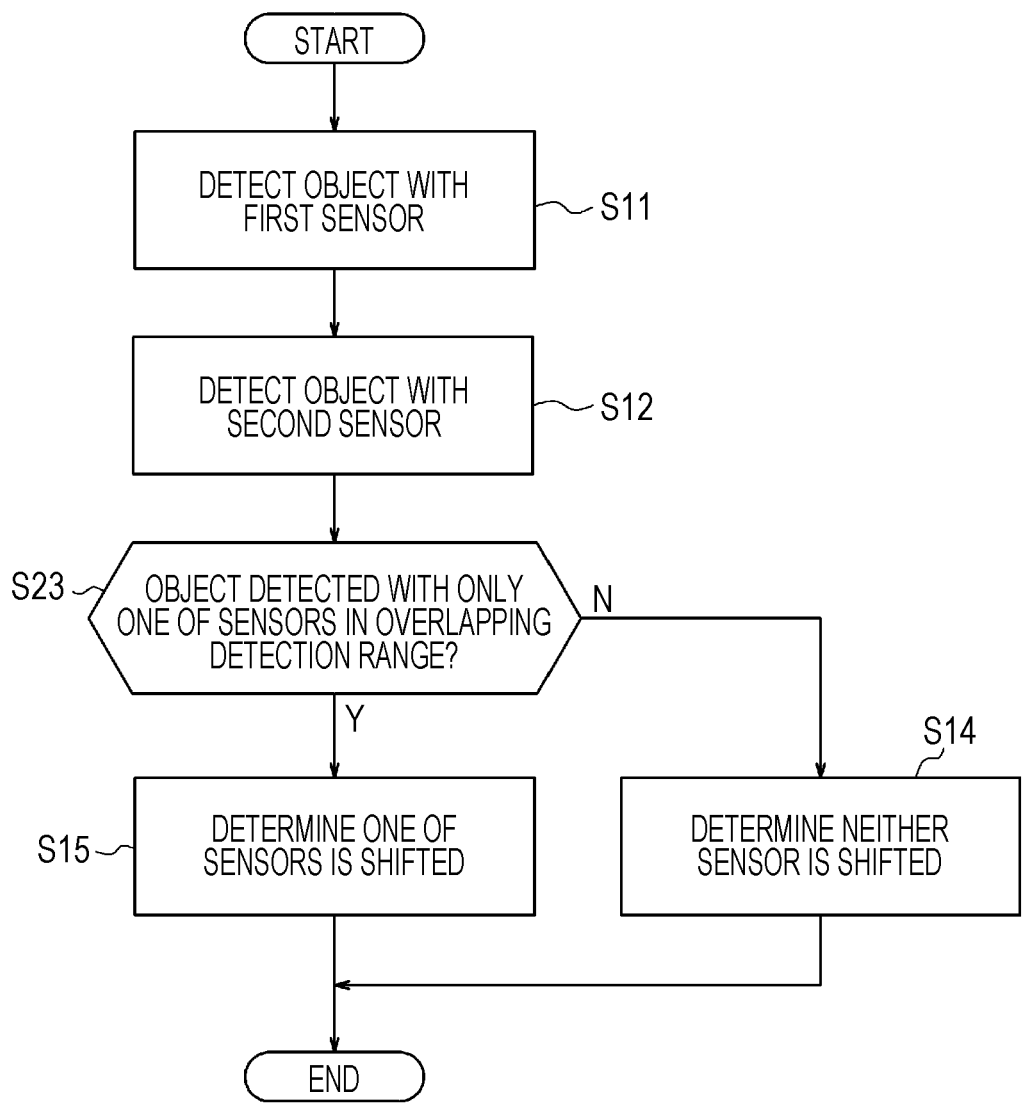
FIG. 11 is a flowchart for describing an operation of the electronic device according to the one embodiment.

FIG. 11 flowchart for describing an operation for determining whether the orientation of either of the two sensors is shifted in the electronic device 1 as described in FIG. 10. It is assumed that the adjustment of the orientations of the plurality of sensors 5 and the calibration of the plurality of sensors 5 as described above have been completed at the time point when the operation illustrated in FIG. 11 starts. In addition, tie operation of the electronic device 1 illustrated in FIG. 11 may be controlled by the control unit 10 and/or the ECU (determination unit) 50, for example. The description is given below on the assumption that the operation of the electronic device 1 illustrated in FIG. 11 is controlled by the ECU 50.

As in the operation illustrated in FIG. 9, the ECU 50 performs the processing of steps S11 and S12 in response to the start of the operation illustrated in FIG. 11.

Then, the ECU 50 determines whether only one of the first and second sensors 5 has detected an object in a detection range in which the detection ranges of the first and second sensors 5 partially overlap originally (for example, at the time of installation of the sensors 5) (step S23). Only one of the first and second sensors 5 detecting an object in step S23 may refer to, for example, a state in which the second sensor 5 does not detect the object detected by the first sensor 5. In addition, only one of the first and second sensors 5 detecting an object in step S23 may refer to, for example, a state in which the first sensor 5 does not detect the object detected by the second sensor 5.

If the sensor 5 that detects the object is not only one of the sensors 5 in step S23 and if it is determined that the locations for the same object are not separate by a predetermined distance or greater, the ECU 50 determines that neither the first sensor nor the second sensor is shifted (step S14). The case where the sensor 5 that detects the object is not only one of the sensors 5 may be, for example, the case where both the first and second sensors detect the object. In addition, the case where the sensor 5 that detects the object is not only one of the sensors 5 may be, for example, a case where the object detected by one of the first and second sensors 5 is detected by the other. On the other hand, if only one of the sensors 5 detects the object in step S23, the ECU 50 determines that either the first sensor or the second sensor is shifted (step S15).

As described above, in the one embodiment, the determination unit 50 may determine a shift in orientation of at least any of the plurality of sensors 5 on the basis of object detection results obtained by the plurality of sensors 5. More specifically, the determination unit 50 may determine whether an orientation of at least any of the plurality of sensors 5 is shifted from the installed orientation on the basis of the locations detected for an object by the plurality of sensors 5. The determination unit 50 may determine the shift in orientation of either the first sensor 5a or the second sensor 5b on the basis of detection results of the same object obtained by the first sensor 5a and the second sensor 5b. For example, a region where the object detection ranges of the sensors partially overlap when the first sensor 5a and the second sensor 5b are installed in the predetermined orientations is referred to an overlapping region. In this case, if the object detected by one of the first sensor 5a and the second sensor 5b is not detected by the other in the overlapping region, the determination unit 50 may determine that the orientation of either the first sensor 5a or the second sensor 5b is shifted.

The electronic device 1 according to the one embodiment can determine, with the plurality of sensors, whether the installed orientations (angles) of the plurality of sensors are appropriate. That is, the electronic device 1 according to the one embodiment no longer needs, for example, another functional unit for detecting the installed states of the plurality of sensors in determining whether the installed orientations (angles) of the sensors are appropriate.

The electronic device 1 according to the one embodiment is capable of determining whether the installed states of the plurality of sensors are appropriate in the electronic device that performs detection of an object by using the sensors. Thus, the electronic device 1 according to the one embodiment can improve the convenience of the electronic device including the plurality of sensors that receive a reflected wave that is a transmission wave transmitted and reflected off a predetermined object.

An example in which the electronic device 1 includes three or more sensors 5 as the plurality of sensors 5 is described next. By including three or more sensors 5, the electronic device 1 according to the one embodiment can determine which of the sensors 5 is shifted in orientation when it is determined that the orientation of either of two sensors 5 is shifted.

Figure 12:
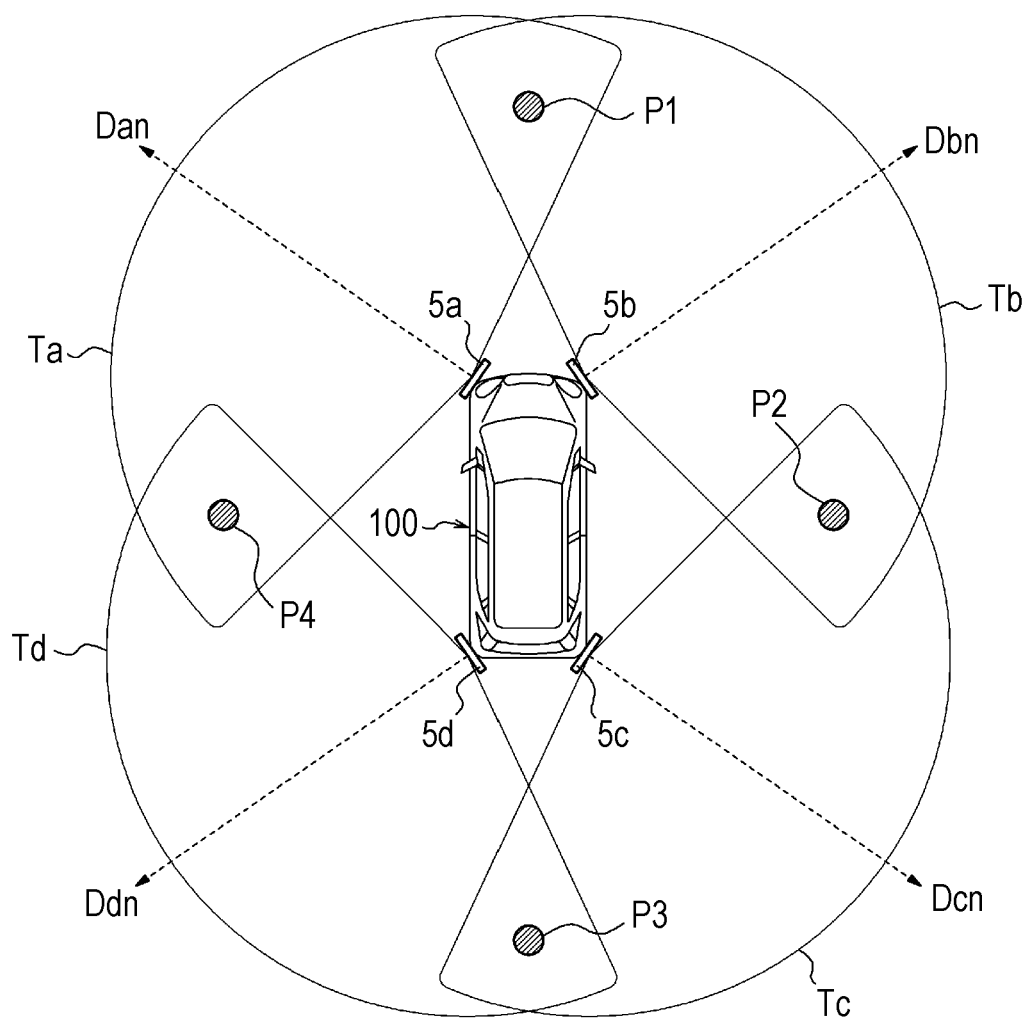
FIG. 12 is a diagram for describing an operation of the electronic device according to the one embodiment.

FIG. 12 is a diagram for describing an example of an operation of the electronic device 1 according to the one embodiment. When the electronic device 1 according to the one embodiment includes four sensors 5, the four sensors 5 may be installed at four positions of the mobility device 100 as illustrated in FIG. 12.

In the example illustrated in FIG. 12, two more sensors 5 may be installed on the mobility device 100 illustrated in FIG. 7. Thus, more detailed description of the sensor installed in the left front portion of the mobility device 100 and the sensor 5b installed in the right front portion of the mobility device 100 is omitted in FIG. 12.

In the example illustrated in FIG. 12, the sensor 5c is installed in a right rear portion of the mobility device 100, and the sensor 5d is installed in a left rear portion of the mobility device 100. In addition, as illustrated in FIG. 12, the sensor 5c in the right rear portion of the mobility device 100 faces in a direction Dcn, and the sensor 5d in the left rear portion of the mobility device 100 faces in a direction Ddn. Thus, in the electronic device 1 according to the one embodiment, the plurality of sensors 5 may be installed in predetermined orientations at different positions. Hereinafter, in the example illustrated in FIG. 12, an object detection range of the sensor 5c may also be referred to as a detection range Tc. In addition, an object detection range of the sensor 5d may also be referred to as a detection range Td. As illustrated in FIG. 12, the sensors 5c and 5d have detection ranges having predetermined central angles with the directions Dcn and Ddn at the center, respectively. In addition, in the example illustrated in FIG. 12, it may be assumed that a transmission wave Tc transmitted from the sensor 5c and a transmission wave Td is transmitted from the sensor 5d.

In the electronic device 1 according to the one embodiment, the sensors 5b and 5c are installed such that the detection ranges of the respective sensors 5 partially overlap as illustrated in FIG. 12. In the example illustrated in FIG. 12, a portion of a right end (end in a clockwise direction) of the detection range Tb of the sensor 5b and a portion of a left end (end in a counterclockwise direction) of the detection range Tc of the sensor 5c have an overlap. That is, both the sensor 5b and the sensor 5c can detect an object in this overlapping portion of the detection range Tb and the detection range Tc. For example, an object P2 illustrated in FIG. 12 is present at a location represented by coordinates (x2, y2). In this case, the object P2 is located in the detection range Tb of the sensor 5b and also in the detection range Tc of the sensor 5c. Thus, both the sensor 5b and the sensor 5c can detect the object P2.

In the electronic device 1 according to the one embodiment, the sensors 5c and 5d are installed such that the detection ranges of the respective sensors 5 partially overlap as illustrated in FIG. 12. In the example illustrated in FIG. 12, a portion of a right end (end in a clockwise direction) of the detection range Tc of the sensor 5c and a portion of a left end (end in a counterclockwise direction) of the detection range Td of the sensor 5d have an overlap. That is, both the sensor 5c and the sensor 5d can detect an object in this overlapping portion of the detection range Tc and the detection range Td. For example, an object P3 illustrated in FIG. 12 is present at a location represented by coordinates (x3, y3). In this case, the object P3 is located in the detection range Tc of the sensor 5c and also in the detection range Td of the sensor 5d. Thus, both the sensor 5c and the sensor 5d can detect the object P3.

In the electronic device 1 according to the one embodiment, the sensors 5d and 5a are installed such that the detection ranges of the respective sensors 5 partially overlap as illustrated in FIG. 12. In the example illustrated in FIG. 12, a portion of a right end (end in a clockwise direction) of the detection range Td of the sensor 5d and a portion of a left end (end in a counterclockwise direction) of the detection range Ta of the sensor 5a have an overlap. That is, both the sensor 5d and the sensor 5a can detect an object in this overlapping portion of the detection range Td and the detection range Ta. For example, an object P4 illustrated in FIG. 12 is present at a location represented by coordinates (x4, y4). In this case, the object P4 is located in the detection range Td of the sensor 5d and also in the detection range Ta of the sensor Thus, both the sensor 5d and the sensor 5a can detect the object P4.

As described above, in the electronic device 1 according to the one embodiment, the plurality of sensors 5 may include the first sensor 5a, the second sensor 5a, and the third sensor 5c (and/or 5d). In addition, the third sensor 5c (or 5d) may be installed in a predetermined orientation such that the object detection range (Ta or Tb) of the first sensor 5a or the second sensor 5b and the object detection range Tc (or Td) of the third sensor 5c (or 5d) partially overlap.

As illustrated in FIG. 12, in the electronic device according to the one embodiment, after the sensors 5a, 5b, 5c, and 5d are installed in correct orientations, calibration of the individual sensors 5 may be then performed in a manner that is same as and/or similar to that described in FIG. 7.

As described above, after the adjustment of the orientations of the sensors 5 and the calibration of the sensors 5 are performed, the orientations of the sensors 5 may shift because of some reasons. For example, suppose that the sensor 5a comes into contact with something and consequently the orientation of the sensor 5a is shifted slightly in a circumstance illustrated in FIG. 12.

Figure 13:
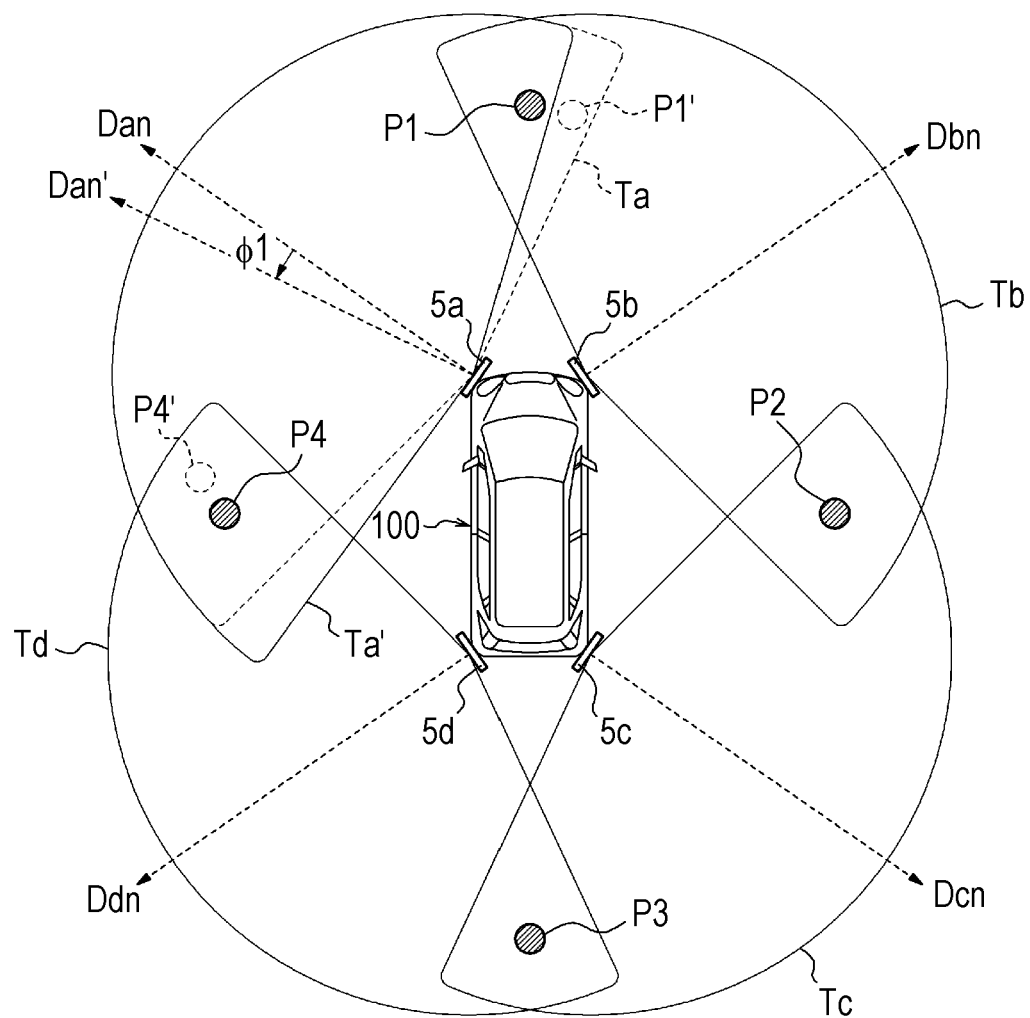
FIG. 13 is a diagram for describing an operation of the electronic device according to the one embodiment.

FIG. 13 is a diagram illustrating a state in which the orientation of the sensor 5a is shifted slightly. For example, suppose that the sensor 5a comes into contact with something and consequently the orientation of the sensor 5a is shifted counterclockwise by $\varphi 1$ as illustrated in FIG. 13. In this case, the orientation of the sensor 5a is shifted from the direction Dan to the direction Dan'. In response to this, the detection range of the sensor 5a is also shifted from the detection range Ta to the detection range Ta' as illustrated in FIG. 13. FIG. 13 illustrates a state in which the same circumstance as that illustrated in FIG. 8 has occurred in the mobility device 100 on which the sensors 5a, 5b, 5c, and 5d are installed. Thus, the description that is same as and/or similar to the description in FIG. 8 is omitted as appropriate.

As described in FIGS. 8 and 9, when two sensors such as the sensors 5a and 5b are installed, it is possible to determine that the orientation of one of the sensors 5a and 5b is shifted. However, in the operation described in FIGS. 8 and 9, it is impossible to determine which of the sensors 5a and 5b is shifted. In contrast, the electronic device 1 including three or more sensors 5 as illustrated in FIG. 13 is capable of determining which of the sensors 5a and 5b is shifted when the orientation of one of the sensors 5a and 5b is shifted. Such an operation is described below.

As illustrated in FIG. 13, both the sensors 5b and 5c detect the same object P2 to be at the same location (coordinates (x2, y2)). Thus, by applying the operation described in FIGS. 8 and 9 to the sensors 5b and 5c, it may be determined that neither the sensor 5b nor the sensor 5c is shifted. In addition, as illustrated in FIG. 13, both the sensors 5c and 5d detect the same object P3 to be at the same location (coordinates (x3, y3)). Thus, by applying the operation described in FIGS. 8 and 9 to the sensors 5c and 5d, it may be determined that neither the sensor 5c nor the sensor 5d is shifted.

On the other hand, as illustrated in FIG. 13, the locations detected for the object P4 by the sensor 5d and the sensor 5a are not the same location in the electronic device 1. In the detection range Td, the sensor 5d detects the object P4 to be at the point (x4, y4). In contrast, since the detection range Ta is shifted to the detection range Ta', the sensor 5a detects the object P4 to be at a location P4'. Here, it is assumed that coordinates of the location P4' are coordinates (x4', y4'). The location of the object detected by the sensor 5a whose orientation is shifted is identified on the basis of the coordinates allocated in the detection range Ta'. The object P4 that is actually at the location of the coordinates (x4, y4) is detected to be near the left end (end in the counterclockwise direction) of the detection range Ta'. This detection range Ta' corresponds to the detection range Ta before the orientation of the sensor 5a is shifted. Thus, the sensor 5a detects the object P4 to be near the left end (end in the counterclockwise direction) of the detection range Ta, that is, at the location P4° (coordinates (x4', y4')). Thus, by applying the operation described in FIGS. 8 and 9 to the sensors 5d and 5a, it may be determined that either the sensor 5d or the sensor 5a is shifted.

The above results are summarized as follows. That it is determined that either the sensor 5a or the sensor 5b is shifted. In addition, it is determined that neither the sensor 5b nor the sensor 5c is shifted. In addition, it is determined that neither the sensor 5c nor the sensor 5d is shifted. In addition, it is determined that either the sensor 5d or the sensor 5a is shifted. From these results, the determination unit 50 can determine that shifted sensor 5 is the sensor 5a.

In addition, for example, only the sensor 5c among the sensors 5c and 5d is installed, it may be determined that the orientation of the sensor 5b is not shifted if both the sensors 5b and 5c detect the same object P2 to be at the same location. In addition, for example, only the sensor 5d among the sensors 5c and 5d is installed, it may be determined that the orientation of the sensor 5a is shifted if the sensors 5d and 5a detect the same object P2 to be at different locations.

As described above, in the electronic device 1 according to the one embodiment, the determination unit 50 may perform processing below when the determination unit 50 determines that the orientation of either the first sensor 5a or the second sensor 5b is shifted. That is, the determination unit 50 may determine which of the first sensor 5a and the second sensor 5b is shifted in orientation on the basis of detection results of the same object obtained by the first sensor 5a or the second sensor 5b and the third sensor 5c (or 5d).

Figure 14:
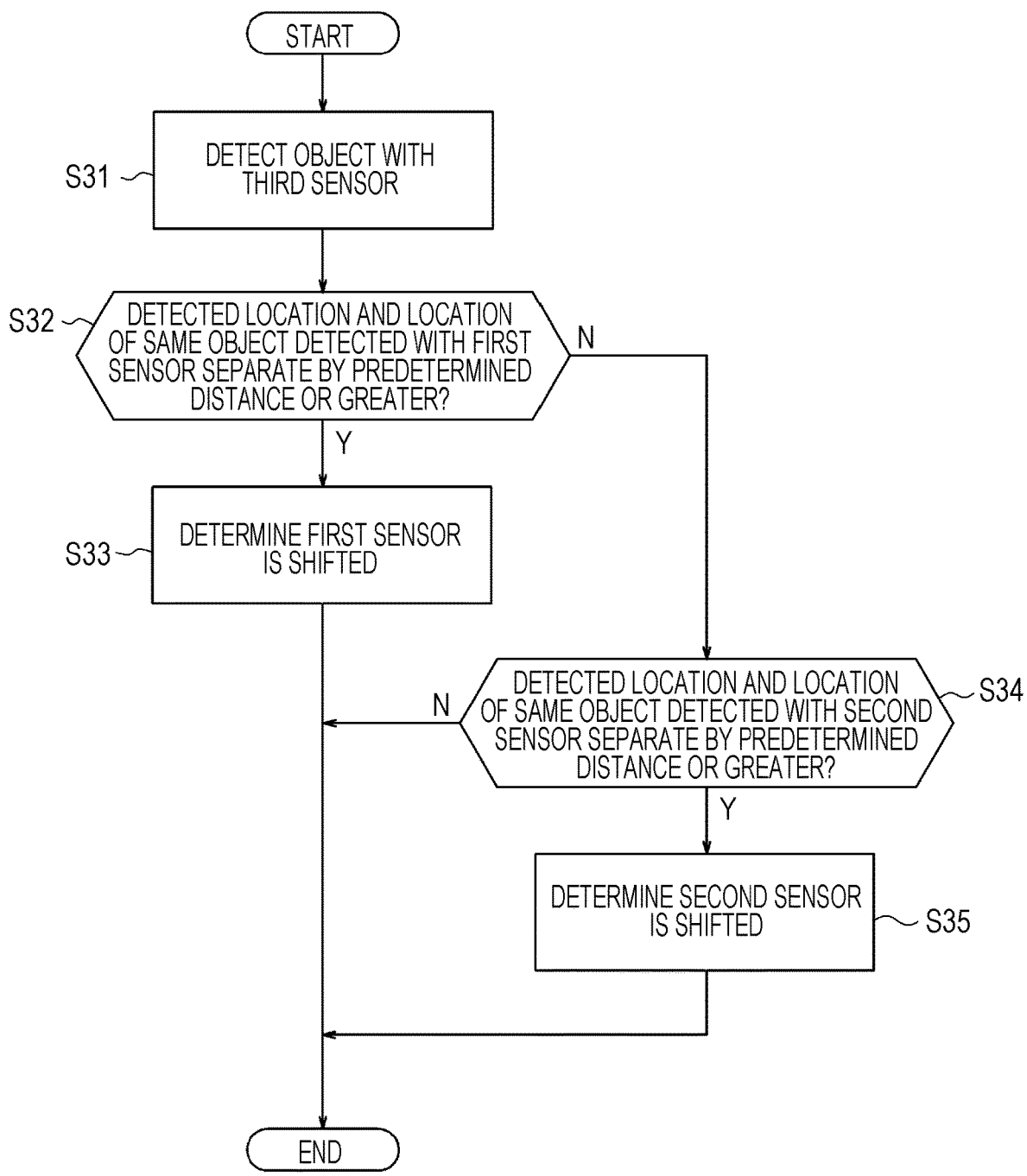
FIG. 14 is a flowchart for describing an operation of the electronic device according to the one embodiment.

FIG. 14 is a flowchart for describing an operation for determining which of the two sensors such as the sensors 5a and 5b is shifted in orientation in the electronic device 1 as described in FIG. 13. The time point when the operation illustrated in FIG. 14 starts may be, for example, the time point when it is determined that either of the two sensors 5 such as the sensors 5a and 5b, for example, is shifted as in step S15 of FIGS. 9 and 11, for example. The operation of the electronic device 1 illustrated in FIG. 14 may be controlled by the control unit 10 and/or the ECU (determination unit) 50, for example. The description is given below on the assumption that the operation of the electronic device 1 illustrated in FIG. 14 is controlled by the ECU 50.

In response to the start of the operation illustrated in FIG. 14, the ECU 50 detects an object with the third sensor (for example, the sensor 5c or 5d) of the electronic device 1 (step S31).

Then, the ECU 50 determines whether the location of the object detected by the first sensor 5a and the location of the object detected by the third sensor 5c or 5d as the same object as the object detected by the first sensor 5a are separate by a predetermined distance or greater (step S32). The operation for determining whether the object is separate by a predetermined distance or greater in step S32 may be performed in a manner that is the same as and/or similar to that in step S13 in FIG. 9.

If it is determined in step S32 that the locations detected for the object by the two sensors 5 are separate by the predetermined distance or greater, the ECU 50 may determine that the orientation of the first sensor 5a is shifted (step S33).

On the other hand, if it is determined in step S32 that the locations detected for the object by the two sensors 5 are not separate by the predetermined distance or greater, the ECU 50 may perform an operation of step S34. In step S34, the ECU 50 determines whether the location of the object detected by the second sensor 5b and the location of the object detected by the third sensor 5c or 5d as the same object as the object detected by the second sensor 5b are separate by a predetermined distance or greater (step S34). The operation for determining whether the object is separate by a predetermined distance or greater in step S34 may be performed in a manner that is the same as and/or similar to that in step S13 in FIG. 9.

If it is determined in step S34 that the locations detected for the object by the two sensors 5 are separate by the predetermined distance or greater, the ECU 50 may determine that the orientation of the second sensor 5b is shifted (step S35).

As described above, by including three or more sensors 5, the electronic device 1 can determine which of the sensors 5a and 5b is shifted when the orientation of one of the sensors 5a and 5b is shifted.

An example in which two sensors 5 are shifted in the same direction by substantially the same degree by coincidence when the electronic device 1 includes three or more sensors 5 as the plurality of sensors 5 is described next.

FIG. 15 is a diagram illustrating a state in which the orientation of the sensor 5a is shifted slightly as illustrated in FIG. 13 and the orientation of the sensor 5b is also shifted slightly. It is assumed that, for example, the sensor 5a comes into contact with something and consequently the orientation of the sensor 5a is shifted counterclockwise by $\varphi 1$ and, for example, the sensor 5b comes into contact with something and consequently the orientation of the sensor 5b is also shifted counterclockwise by p1 as illustrated in FIG. 15. In this case, the orientation of the sensor 5a is shifted from the direction Dan to the direction Dan'. In response to this, the detection range of the sensor 5a is also shifted from the detection range Ta to the detection range Ta' as illustrated in FIG. 15. In addition, in this case, the orientation of the sensor 5b is shifted from the direction Dbn to a direction Dbn'. In response to this, the detection range of the sensor 5b is also shifted from the detection range Tb to a detection range Tb' as illustrated in FIG. 15.

As in FIG. 13, it is assumed also in FIG. 15 that the object P1 is present at the location (x1, y1) in the front direction of the mobility device 100. In such a circumstance, detecting the object P1 with the sensor 5a and the sensor 5b is discussed. Since the detection range Ta is shifted to the detection range Ta', the sensor 5a detects the object P1 to be at the location P1' as illustrated in FIG. 15. Here, it is assumed that coordinates of the location P1' are coordinates (x1', y1'). Since the detection range Tb is shifted to the detection range Tb', the sensor 5b also detects the object P1 to be at the location P1'. That is, in this case, the sensors 5a and 5b are shifted in the same direction by the same angle by coincidence. In such a case, even if the electronic device 1 performs the operation of FIGS. 8 and 9, for example, it is not determined that the orientation of either the sensor 5a or the sensor 5b is shifted.

However, as in the state illustrated in FIG. 13, the sensor 5d detects the object P4 to be located at the point (x4, y4) in the detection range Td in the state illustrated in FIG. 15. In contrast, since the detection range Ta is shifted to the detection range Tag, the sensor 5a detects the object P4 to be at the location P4'. Likewise, the sensor 5c detects the object P2 to be at the point (x2, y2) in the detection range Tc in the state illustrated in FIG. 15. In contrast, since the detection range Tb is shifted to the detection range Tb', the sensor 5b detects the object P2 to be at the location P2'. In such a case, it can be determined that both the sensors 5a and 5b are shifted in the same direction by the same degree.

As described above, in the electronic device 1 according to the one embodiment, the determination unit 50 may perform processing below when the locations detected for a same first object by the first sensor 5a and the second sensor 5b are within a predetermined distance. That is, the determination unit 50 may determine whether the orientations of both the first sensor 5a and the second sensor 5b are shifted on the basis of detection results of a same second object obtained by the first sensor 5a or the second sensor 5b and the third sensor 5c (or 5d).

Figure 16:
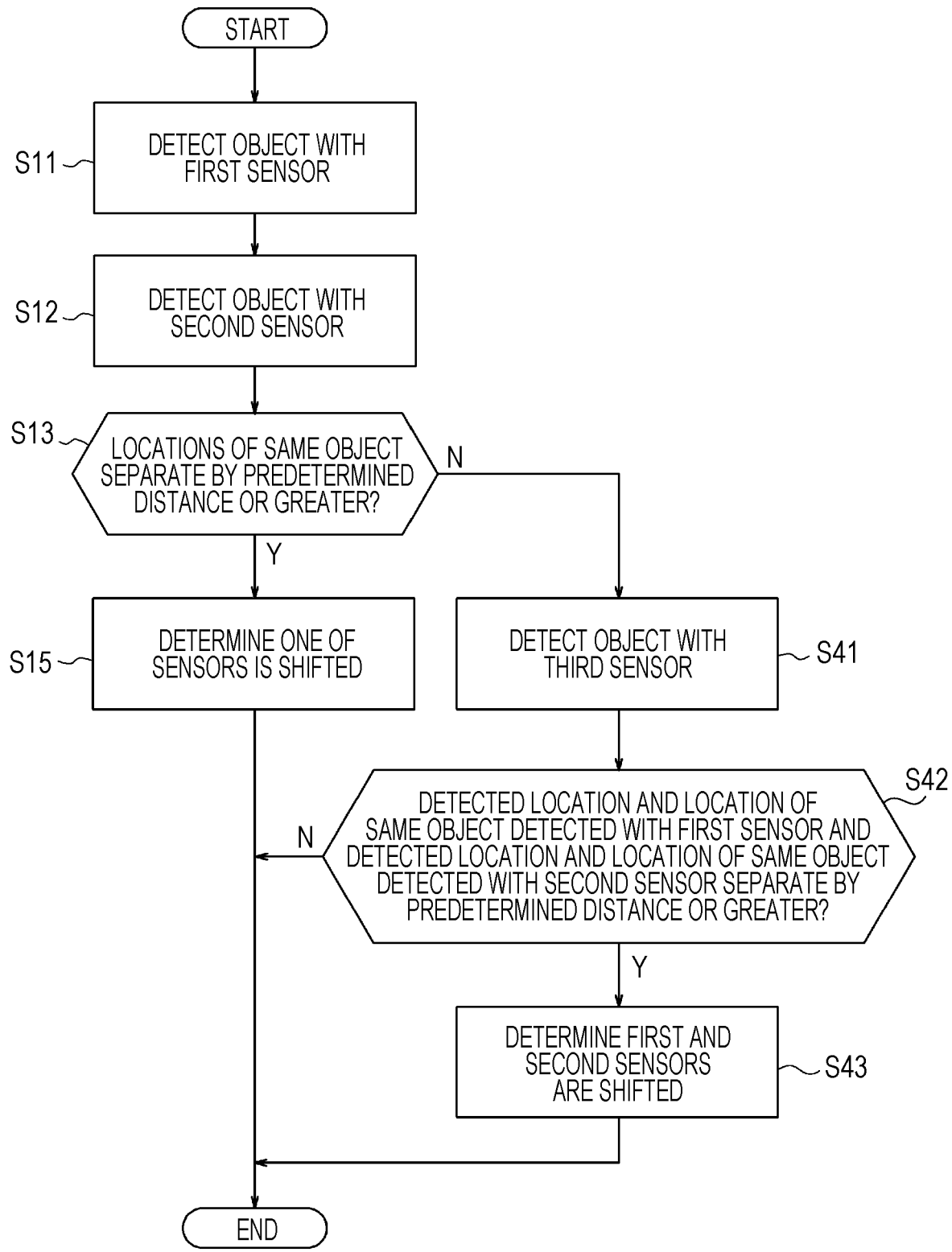
FIG. 16 is a flowchart for describing an operation of the electronic device according to the one embodiment.

FIG. 16 is a flowchart for describing an operation for determining that two sensors such as the sensors 5a and 5b are shifted in the same direction by the same degree in the electronic device 1 as illustrated in FIG. 15.

The time point when the operation illustrated in FIG. 16 starts may be, for example, the time point when the adjustment of the orientations of the plurality of sensors 5 and the calibration of the plurality of sensors 5 are completed as in the operation illustrated in FIGS. 9 and 11, for example.

In response to the start of the operation illustrated in FIG. 16, the ECU 50 detects an object with the first sensor (for example, the sensor 5a) of the electronic device (step S11). Then, the ECU 50 detects the object with the second sensor (for example, the sensor 5b) of the electronic device 1 (step S12).

Then, the ECU 50 determines whether locations (for example, coordinates) detected for the same object (for example, the object P1) by the first and second sensors are separate by a predetermined distance or greater (step S13). To determine whether the locations for the same object are separate by the predetermined distance or greater in step S13, a distance at which the locations can be regarded as being the same location may be set and stored in, for example, the storage unit 40 or the like in advance. The distance at which the locations can be regarded as being the same location may be determined on the basis of various factors including the object detection accuracy of the electronic device 1. For example, if the distance between the locations detected for the same object by the sensor 5a and the sensor 5b is equal to or less than 5 cm, it may be regarded that the sensor 5a and the sensor 5b detect the same object to be at the same location. In this case, if the distance between the locations detected for the same object by the sensor 5a and the sensor 5b exceeds 5 cm, it may be regarded that the sensor 5a and the sensor 5b detect the same object to be at different locations.

If it is determined in step S13 that the locations for the same object are separate by the predetermined distance or greater, the ECU 50 determines one of the first sensor and the second sensors is shifted (step S15). In this case, the operation illustrated in FIG. 14 may be performed.

On the other hand, if it is not determined in step S13 that the locations for the same object are separate by the predetermined distance or greater, the ECU 50 detects the object with the third sensor 5c (or 5d) (step S41). The ECU 50 determines whether the location of the object detected by the third sensor 5c (or 5d) in step S41 and the location of the object detected by the first sensor 5a and the second sensor 5b as the same object as the object detected by the third sensor 5c are separate by a predetermined distance or greater (step S42). The operation for determining whether the object is separate by the predetermined distance or greater in step S42 may be performed in a manner that is the same as and/or similar to that in step S13 in FIG. 9.

If it is determined in step S42 that the locations for the object are separate by the predetermined distance or greater, the ECU 50 may determine that the orientations of the first sensor 5a and the second sensor 5b are shifted (step S43).

As described above, by including three or more sensors 5, the electronic device 1 can determine whether the two sensors 5 are shifted in the same direction by the same degree by coincidence.

An operation performed when the orientation of the sensor 5 is shifted in the electronic device 1 is described next.

In the electronic device 1 according to the one embodiment, if it is determined that the orientation of the sensor 5 is shifted and if the shift is a degree correctable through calibration, the shift may be corrected by performing calibration, for example. On the other hand, in the electronic device 1 according to the one embodiment, if it is determined that the orientation of the sensor 5 is shifted and if the shift is a degree uncorrectable through calibration, the shift of the sensor 5 may be reported to a user by the reporting unit 90, for example.

Figure 17:
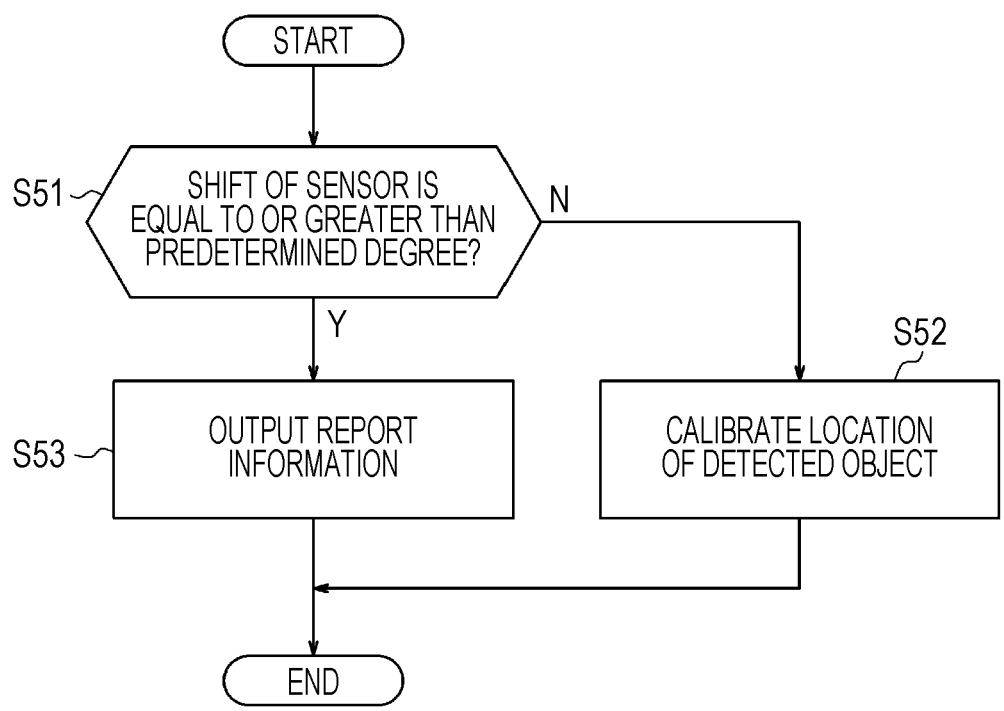
FIG. 17 is a flowchart for describing an operation of the electronic device according to the one embodiment.

FIG. 17 is a flowchart for describing an operation performed when the orientation of the sensor 5 is shifted in the electronic device 1. The time point when the operation illustrated in FIG. 17 starts may be the time point when the determination unit 50 determines that the orientation of any of the sensors 5 is shifted. For example, the time point when the operation illustrated in FIG. 17 starts may be after step S15 of FIGS. 9 and 11, after steps S33 and S35 of FIG. 14, and after step S43 of FIG. 16.

In response to the start of the operation illustrated in FIG. 17, the ECU 50 determines whether the shift of the sensor 5 determined to be shifted is equal to or greater than a predetermined degree (step S51). The predetermined degree of shift to be compared with the shift of the sensor 5 in step S51 may be stored in advance in the storage unit 40 or the like as a degree of shift for which the sensor 5 can be calibrated in the electronic device 1, for example.

If it is determined in step S51 that the shift of the sensor 5 is not equal to or greater than the predetermined degree, the ECU 50 performs calibration of the location of the object detected by the sensor 5 (step S52). On the other hand, if it is determined in step S51 that the shift of the sensor 5 is equal to or greater than the predetermined degree, the ECU 50 outputs information (report information) indicating that the sensor 5 is shifted, from the reporting unit 90, for example (step S53).

In step S53, the information indicating that the sensor 5 is shifted may be, for example, at least any of excessive information based on voice or sound, visual information such as an indication, and sensing information such as a vibration. In addition, the information indicating that the sensor 5 is shifted may be, for example, information for prompting the driver or the like of the mobility device 100 to fix or adjust the sensor 5. As a result of the report information being output in step S53, for example, the driver or the like of the mobility device 100 can recognize the orientation of any of the sensors 5 is shifted.

As described above, in the electronic device 1 according to the one embodiment, the determination unit 50 may perform calibration of the location of the object detected by at least any of the plurality of sensors 5 when determining that the shift in orientation of any of the plurality of sensors 5 is within a predetermined degree. In addition, in the electronic device 1 according to the one embodiment, the determination unit 50 may output predetermined report information, for example, from the reporting unit 90 when determining that the shift in orientation of any of the plurality of sensors 5 exceeds the predetermined degree.

While the present disclosure has been described on the basis of the various drawings and the embodiment, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without causing any logical contradiction. A plurality of functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, a plurality of functional units, means, steps, or the like may be combined to one or may be divided. In addition, the embodiments according to the present disclosure described above are not limited to strict implementation according to the respective embodiments described above, and may be implemented by appropriately combining the features or omitting part thereof.

The embodiment described above is not limited to implementation as the electronic device 1. For example, the embodiment described above may be implemented as a method for controlling a device such as the electronic device 1. For example, the embodiment described above may be implemented as a program for controlling a device such as the electronic device 1.

In the embodiment described above, the ECU 50 of the electronic device 1 determines, as a shift in orientation of the sensor 5, a shift in a horizontal direction that is parallel to an KY plane illustrated in FIG. 12, for example. However, the ECU 50 of the electronic device 1 according to the one embodiment may determine, as a shift in orientation of the sensor 5, a shift in a direction that is perpendicular to the KY plane illustrated in FIG. 12, for example.

REFERENCE SIGNS LIST

1 electronic device
5 sensor
10 control unit
11 distance FFT processing unit
12 velocity FF1 processing unit
13 angle-of-arrival estimating unit
14 object detecting unit
15 detection range determining unit
16 parameter setting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU (determination
82 steering
84 gears
90 reporting unit
100 mobility device
200 object

The invention claimed is:

1. An electronic device comprising: a plurality of sensors installed in predetermined orientations at different positions, each of the plurality of sensors comprising:

a transmission antenna that transmits a transmission wave;
a reception antenna that receives a reflected wave that is the transmission wave having been reflected; and
a first processor configured to detect an object that reflects the transmission wave, based on a transmission signal transmitted as the transmission wave and a reception signal received as the reflected wave, the electronic device further comprising: a second processor configured to determine a shift in orientation of at least any of the plurality of sensors, based on detection results of the object obtained by the plurality of sensors, wherein:

the plurality of sensors comprise a first sensor, a second sensor, and a third sensor, the first sensor and the second sensor are installed in predetermined orientations such that an object detection range of the first sensor and an object detection range of the second sensor partially overlap, the second processor is configured to determine a shift in orientation of either the first sensor or the second sensor, based on detection results of an identical object obtained by the first sensor and the second sensor, the third sensor is installed in a predetermined orientation such that the object detection range of the second sensor partially overlaps with the object detection range of the first sensor and with an object detection range of the third sensor, and the second processor is configured to determine whether the orientations of both the first sensor and the second sensor are shifted, based on detection results of an identical second object obtained by the third sensor and another sensor in a case where locations detected for an identical first object by the first sensor and the second sensor are within a predetermined distance, wherein the predetermined distance is determined on a basis of object detection accuracy of the electronic device.

2. The electronic device according to claim 1, wherein the second processor is configured to determine whether the orientation of at least any of the plurality of sensors is shifted from an installed orientation, based on locations detected for the object by the plurality of sensors.

3. The electronic device according to claim 1, wherein the second processor is configured to determine that the orientation of either the first sensor or the second sensor is shifted in a case where locations detected for the identical object by the first sensor and the second sensor are separate by a predetermined distance or greater, wherein the predetermined distance is determined on a basis of object detection accuracy of the electronic device.

4. The electronic device according to claim 3, wherein the third sensor is installed in a predetermined orientation such that the object detection range of the first sensor or the second sensor and an object detection range of the third sensor partially overlap, and the second processor is configured to determine which of the first sensor and the second sensor is shifted in orientation, based on detection results of an identical object obtained by the first sensor or the second sensor and the third sensor in a case where the second processor determines that the orientation of either the first sensor or the second sensor is shifted.

5. The electronic device according to claim 1, wherein the second processor is configured to determine that the orientation of either the first sensor or the second sensor is shifted in a case where an object detected by one of the first sensor and the second sensor is not detected by the other one of the first sensor and the second sensor in a region where the object detection ranges of the first sensor and the second sensor partially overlap when the first sensor and the second sensor are installed in the predetermined orientations.

6. The electronic device according to claim 1, wherein the second processor is configured to perform calibration of a location of the object detected by the at least any of the plurality of sensors in a case where the second processor determines that the shift in orientation of the any of the plurality of sensors is within a predetermined degree.

7. The electronic device according to claim 1, wherein the second processor is configured to output predetermined report information in a case where the second processor determines that the shift in orientation of the any of the plurality of sensors exceeds a predetermined degree.

8. A method for controlling an electronic device comprising a plurality of sensors installed in predetermined orientations at different positions,
   each of the plurality of sensors comprising:
      a transmission antenna that transmits a transmission wave;
      a reception antenna that receives a reflected wave that is the transmission wave having been reflected; and
      a first processor configured to detect an object that reflects the transmission wave, based on a transmission signal transmitted as the transmission wave and a reception signal received as the reflected wave,
   the method comprising: a step of determining a shift in orientation of at least any of the plurality of sensors, based on detection results of the object obtained by the plurality of sensors, wherein:
   the plurality of sensors comprise a first sensor, a second sensor, and a third sensor,
   the first sensor and the second sensor are installed in predetermined orientations such that an object detection range of the first sensor and an object detection range of the second sensor partially overlap,
   the second processor is configured to determine a shift in orientation of either the first sensor or the second sensor, based on detection results of an identical object obtained by the first sensor and the second sensor,
   the third sensor is installed in a predetermined orientation such that the object detection range of the second sensor partially overlaps with the object detection range of the first sensor and with an object detection range of the third sensor, and
   the second processor is configured to determine whether the orientations of both the first sensor and the second sensor are shifted, based on detection results of an identical second object obtained by the third sensor and another sensor in a case where locations detected for an identical first object by the first sensor and the second sensor are within a predetermined distance, wherein the predetermined distance is determined on a basis of object detection accuracy of the electronic device.

9. A non-transitory computer-readable recording medium storing computer program instructions, which when executed by an electronic device comprising a plurality of sensors installed in predetermined orientations at different positions,
   each of the plurality of sensors comprising:
      a transmission antenna that transmits a transmission wave;
      a reception antenna that receives a reflected wave that is the transmission wave having been reflected; and
      a first processor configured to detect an object that reflects the transmission wave, based on a transmission signal transmitted as the transmission wave and a reception signal received as the reflected wave,
   causing the electronic device to
      determine a shift in orientation of at least any of the plurality of sensors, based on detection results of the object obtained by the plurality of sensors, wherein:
   the plurality of sensors comprise a first sensor, a second sensor, and a third sensor,
   the first sensor and the second sensor are installed in predetermined orientations such that an object detection range of the first sensor and an object detection range of the second sensor partially overlap,
   the second processor is configured to determine a shift in orientation of either the first sensor or the second sensor, based on detection results of an identical object obtained by the first sensor and the second sensor,
   the third sensor is installed in a predetermined orientation such that the object detection range of the second sensor partially overlaps with the object detection range of the first sensor and with an object detection range of the third sensor, and
   the second processor is configured to determine whether the orientations of both the first sensor and the second sensor are shifted, based on detection results of an identical second object obtained by the third sensor and another sensor in a case where locations detected for an identical first object by the first sensor and the second sensor are within a predetermined distance, wherein the predetermined distance is determined on a basis of object detection accuracy of the electronic device.

\* \* \* \* \*